(12) United States Patent
Titus et al.

(10) Patent No.: US 6,406,227 B1
(45) Date of Patent: *Jun. 18, 2002

(54) KEY MEASUREMENT APPARATUS AND METHOD

(75) Inventors: John S. Titus, Prior Lake; John E. Bolkcom, Plymouth, both of MN (US)

(73) Assignee: Machine Magic LLC, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,090

(22) Filed: Feb. 1, 2000

Related U.S. Application Data

(63) Continuation-in-part of application No. 09/122,248, filed on Jul. 24, 1998, now Pat. No. 6,152,662, which is a continuation-in-part of application No. 08/903,561, filed on Jul. 31, 1997, now Pat. No. 5,908,273.

(51) Int. Cl.[7] .................................................. B23C 1/16
(52) U.S. Cl. ............................ 409/81; 409/96; 409/99; 700/161; 700/163; 700/195; 356/607
(58) Field of Search .............................. 409/80, 81, 83, 409/96, 117, 98, 99, 128, 132, 131; 76/110; 700/161, 163, 195, 118, 182, 98, 159; 356/607, 608

(56) References Cited

U.S. PATENT DOCUMENTS

| | | | |
|---|---|---|---|
| 2,386,816 A | * 10/1945 | Scholz | 409/96 |
| 2,445,041 A | * 7/1948 | Scholz | 409/128 |
| 3,276,328 A | 10/1966 | Schreiber et al. | |
| 3,323,420 A | 6/1967 | Roxburgh | |
| 3,388,619 A | 6/1968 | Schreiber et al. | |
| 3,430,535 A | 3/1969 | Haggstrom | |
| 3,442,174 A | 5/1969 | Weiner et al. | |
| 3,457,831 A | 7/1969 | Adler et al. | |
| 3,466,747 A | 9/1969 | Patriquin et al. | |
| 3,496,636 A | 2/1970 | Lieptz | |
| 3,499,366 A | 3/1970 | Spain | |
| RE26,848 E | 4/1970 | Simon | |
| 3,602,092 A | 8/1971 | Richens | |
| 3,633,451 A | 1/1972 | Lieptz | |
| 3,656,402 A | 4/1972 | French | |
| 3,675,536 A | 7/1972 | Hungerford, Jr. et al. | |

(List continued on next page.)

FOREIGN PATENT DOCUMENTS

| | | | |
|---|---|---|---|
| EP | 053730 A1 | * | 6/1982 |
| EP | 614717 A1 | * | 9/1994 |
| EP | 0614717 A1 | * | 9/1994 |
| FR | 2489535 | | 3/1982 |
| JP | 59-153106 A | * | 9/1984 |
| JP | 63-311108 A | * | 12/1988 |
| JP | 63-311109 A | * | 12/1988 |
| WO | WO-90/03867 A1 | * | 4/1990 |
| WO | WO-00/54212 A1 | * | 9/2000 |

OTHER PUBLICATIONS

International Search Report for PCT/US01/03196, dated May 2001.*

Johnannesson M., Sheet–of–light Range Imaging, Linkoping Studies in Science and Technology Thesis No. 404, Nov. 1993, pp. 10–13, 74, 129–131.

Jalkio J., The Analysis and Design of Triangulation Based Three Dimensional Machine Vision Systems, A Thesis Submitted to the Faculty of the Graduate School of the University of Minnesota, 1987, pp. 41, 59, 86,115–118.

*Primary Examiner*—William Briggs
*Assistant Examiner*—Erica E Cadugan
(74) *Attorney, Agent, or Firm*—Altera Law Group, LLC

(57) ABSTRACT

In a method and apparatus for measuring an original key, a line of the light is focused onto the key surface in a direction perpendicular to the key surface. A camera, or other type of detector is disposed to receive light deflected by the key at an oblique angle. The keyway and keycode of the key can be determined from the deflected pattern of light.

27 Claims, 30 Drawing Sheets

U.S. PATENT DOCUMENTS

| | | | |
|---|---|---|---|
| 3,722,341 A | 3/1973 | Hungerford, Jr. et al. | |
| RE27,665 E | 6/1973 | Spain | |
| 3,769,865 A | 11/1973 | Kleist | |
| 3,795,174 A | 3/1974 | Oliver et al. | |
| 3,796,130 A | 3/1974 | Gartner | |
| 3,807,276 A | 4/1974 | Oliver | |
| 3,865,011 A | 2/1975 | Patriquin | |
| 3,884,121 A | 5/1975 | Agius | |
| 3,919,920 A | 11/1975 | Schlage | |
| 3,945,298 A | 3/1976 | Cockroft | |
| 3,956,968 A | 5/1976 | Crasnianski | |
| 3,981,214 A | 9/1976 | Wich | |
| 4,012,991 A | 3/1977 | Uyeda | |
| 4,019,415 A | 4/1977 | Wich | |
| 4,023,464 A | 5/1977 | Zion | |
| 4,051,748 A | 10/1977 | Sherman | |
| 4,062,261 A | 12/1977 | Stahl | |
| 4,088,060 A | 5/1978 | Johns | |
| 4,090,303 A | 5/1978 | Uyeda | |
| 4,092,806 A | 6/1978 | Wich | |
| 4,117,763 A | 10/1978 | Uyeda | |
| 4,132,151 A | 1/1979 | Weber | |
| 4,143,582 A | 3/1979 | Heimann | |
| 4,188,163 A | 2/1980 | Juskevic | |
| 4,251,173 A | 2/1981 | Saucedo | |
| 4,256,423 A | 3/1981 | Juskevic | |
| 4,300,170 A | 11/1981 | Sakamoto | |
| 4,300,836 A | 11/1981 | Holmes et al. | |
| 4,354,780 A | 10/1982 | Bougiouris | |
| 4,373,414 A | 2/1983 | Agius | |
| 4,468,994 A | 9/1984 | Lieptz | |
| 4,472,056 A * | 9/1984 | Nakagawa et al. | 356/607 |
| 4,521,142 A | 6/1985 | Juskevic | |
| 4,525,908 A | 7/1985 | Bernstein | |
| 4,526,498 A | 7/1985 | Fieldhouse | |
| 4,553,844 A * | 11/1985 | Nakagawa et al. | 356/608 |
| 4,558,215 A * | 12/1985 | Kaneko et al. | 356/608 |
| 4,562,759 A | 1/1986 | Schmitt | |
| 4,638,567 A | 1/1987 | Leversee | |
| 4,651,604 A | 3/1987 | Almblad et al. | |
| 4,653,104 A | 3/1987 | Tamura | |
| 4,657,448 A | 4/1987 | Alexander | |
| 4,666,351 A | 5/1987 | Marchal | |
| 4,671,711 A | 6/1987 | Steinbach et al. | |
| 4,687,389 A | 8/1987 | Santii et al. | |
| 4,717,294 A | 1/1988 | Grasser | |
| 4,741,652 A | 5/1988 | Marchal | |
| 4,780,032 A | 10/1988 | Uyeda et al. | |
| 4,803,371 A | 2/1989 | Durland | |
| 4,821,200 A * | 4/1989 | Oberg | 700/182 |
| 4,898,504 A | 2/1990 | Agius et al. | |
| 4,899,391 A | 2/1990 | Cimino et al. | |
| 4,929,129 A | 5/1990 | Dickson | |
| 4,929,843 A | 5/1990 | Chmielewski, Jr. | |
| 4,969,782 A | 11/1990 | Castain | |
| 4,971,489 A | 11/1990 | Womack | |
| 4,993,291 A | 2/1991 | Sopko | |
| 4,998,349 A | 3/1991 | Killeen | |
| 5,056,204 A * | 10/1991 | Bartschi | 700/163 |
| 5,088,864 A * | 2/1992 | Yanagida | 409/96 |
| 5,094,538 A * | 3/1992 | Reedman et al. | 356/602 |
| 5,111,056 A * | 5/1992 | Yoshimura et al. | 356/608 |
| 5,122,018 A | 6/1992 | Zion | |
| 5,127,532 A | 7/1992 | Cimino et al. | |
| 5,128,531 A | 7/1992 | Fadel | |
| 5,165,315 A | 11/1992 | Terada | |
| 5,171,112 A | 12/1992 | Roland | |
| 5,229,619 A * | 7/1993 | Van Amstel | 356/608 |
| 5,244,321 A | 9/1993 | Sopko | |
| 5,255,199 A | 10/1993 | Barkman et al. | |
| 5,259,708 A | 11/1993 | Brice | |
| 5,271,698 A | 12/1993 | Heredia et al. | |
| 5,307,151 A | 4/1994 | Hof et al. | |
| 5,314,274 A | 5/1994 | Heredia et al. | |
| 5,393,967 A | 2/1995 | Rice et al. | |
| 5,416,591 A * | 5/1995 | Yoshimura et al. | 356/608 |
| 5,443,339 A | 8/1995 | Heredia et al. | |
| 5,496,138 A | 3/1996 | Drori | |
| 5,517,299 A | 5/1996 | Teratani et al. | |
| 5,538,374 A | 7/1996 | Cole et al. | |
| 5,543,103 A * | 8/1996 | Hogan et al. | 409/80 |
| 5,552,992 A * | 9/1996 | Hunter | 700/118 |
| 5,556,240 A | 9/1996 | Almblad | |
| 5,583,443 A | 12/1996 | McMurty et al. | |
| 5,677,522 A | 10/1997 | Rice et al. | |
| 5,807,042 A | 9/1998 | Almblad et al. | |
| 5,886,775 A * | 3/1999 | Houser et al. | 356/607 |
| 5,926,388 A * | 7/1999 | Kimbrough et al. | 700/118 |
| 5,982,491 A * | 11/1999 | Breyer et al. | 356/608 |
| 6,152,662 A * | 11/2000 | Titus et al. | 409/132 |
| 6,175,638 B1 * | 1/2001 | Yanovsky | 409/81 |
| 6,185,311 B1 * | 2/2001 | Yanovsky et al. | 409/96 |

* cited by examiner

KEY MEASUREMENT APPARATUS AND METHOD

This is a continuation-in-part of application Ser. No. 09/122,248, now U.S. Pat. No. 6,152,662, filed Jul. 24th, 1998, which is a continuation-in-part of U.S. Pat. No. 5,908,273, filed Jul. 31, 1997, both of which are incorporated herein by reference.

FIELD OF THE INVENTION

The present invention is directed generally to a method and apparatus for measuring a key, in particular a method for measuring a key in order to make a subsequent duplicate of the key.

BACKGROUND

Hundreds of millions of keys are generated in the United States each year by making a duplicate from an original key or from a parent duplicate key. The duplication process commonly takes place in a hardware store, or the like, that is equipped with a key duplication machine.

Duplicating a key is difficult task, typically requiring high skill in operating the duplicating machine. A high degree of skill is particularly required when duplicating a double sided key in order to achieve correct registration of the second side after cutting the first side. Due to the high probability of making an error when duplicating a key, a significant number of the duplicate keys made each year are discarded as being unusable.

Since there is a wide variation in the types of keys manufactured, the locksmith or hardware store where the duplicate is made has to carry a large number of different key blanks, often numbering in the thousands, in inventory from which an appropriate blank is selected for forming the duplicate key. When faced with duplicating a key of unknown origin, the person performing the duplication is presented with the difficult task of selecting the correct key blank with which to manufacture the duplicate. This may lead to the selection of the wrong key blank, thus resulting in an unusable duplicate key.

The security hierarchy adopted by many key manufacturers includes thicker keys with relatively complex keyways for use in single locks, and master keys that are thinner and have relatively simple keyways. Often, master key blanks are employed for forming duplicate keys in an attempt to reduce the number of key blanks required in inventory, irrespective of whether the key being duplicated is a master key or is cut for a single lock. Consequently, the security hierarchy is compromised when a large number of keys cut from master key blanks enter into use.

One manufacturer has adopted a system that uses a small number of key blanks in which it is claimed most keys can be duplicated, thus reducing the level of skill required of the person performing the duplication. However, this system still requires a significant inventory of different key blanks and, additionally, is subject to the problem of low-skilled operators making a large number of rejectable duplicate keys.

Therefore, there remains a need for a key duplicating system which further reduces the number of types of key blanks required to be carried in inventory. Additionally, there is a need to remove the factor of operator skill level from the duplication process so that fewer rejectable duplicate keys are manufactured.

SUMMARY OF THE INVENTION

Generally, the present invention relates to an apparatus and method for measuring the original key from which a duplicate key is to be made. In particular, the method permits measurement of the keyway and the keycode so that machining instructions may be developed to form the duplicate key using the measurements of the keyway and keycode of the original key.

In one embodiment, the invention is directed to a method of measuring an original key having a keyway on a major surface of a key shaft. The method comprises illuminating the major surface of the key shaft with a line of light focused approximately on the major surface of the original key, the light propagating in a direction substantially perpendicular to an axis of the original key parallel to the shaft. The method also comprises detecting light deflected from the light beam by the surface of the original key at an angle non-perpendicular to the major surface.

In another embodiment, the invention is directed to a system for measuring an original key having a keyway on a major surface of a key shaft. The system includes means for illuminating the major surface of the key shaft with a line of light focused approximately on the major surface of the original key, the light propagating in a direction substantially perpendicular to an axis of the original key parallel to the shaft; and means for detecting light deflected from the light beam by the surface of the original key at an angle non-perpendicular to the major surface.

In another embodiment, the invention is directed to a system for measuring an original key having at least one groove in a first major surface of a key shaft forming a keyway. The system comprises a key holder to hold the original key in a pre-selected position with the key shaft approximately parallel to a first axis and a light source producing a beam of light directed substantially perpendicular to the first axis towards the first major surface. The system also includes a light detector positioned to receive light deflected in a direction substantially non-perpendicular to the first axis when the original key is held in the key holder at the pre-selected position.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1B:
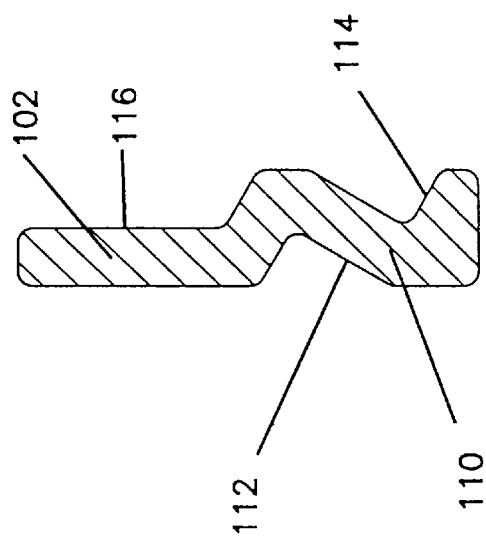
FIG. 1B is a cross-sectional view of the key taken through the section 1B—1B shown FIG. 1A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a method and apparatus for duplicating a key that provides a significant benefit in avoiding the need for maintaining an inventory of different types of key blanks. The present invention advantageously provides for a large number of different types of keys to be cut from one type of blank preform. The preform may simply be a piece of stock metal material: no keycode or keyway need be present on the preform prior to the duplication process taking place. In a typical duplication process, the preform may be cut to the correct length, width and thickness, in addition to having the keycode and keyway formed thereon. Additionally, the number of unusable duplicates is reduced because the duplication process of the present invention obviates the need for a skilled operator. Therefore, unlike conventional key duplicators, the key duplicator of the present invention need not be located where there is an operator having a high level of skill, such as a hardware store, or a locksmith.

It will be appreciated that the use of the terms "copy" and "duplicate" should not be taken to mean that the second key formed as a copy of the original key is exactly the same as the original key in every way. The duplicate key may have a different shape of key bow, for example. Also, the details of the key code or the keyway in the duplicate may be different, for example one or more corners of the original key may be rounded due to wear, while the duplicate key may not be formed with the rounded corners. The words "copy' and "duplicate" may be taken as referring to a process that makes a duplicate key whose keyway and keycode are sufficiently close to those of the original key that the duplicate can operate the lock for which the original key was designed.

Figure 1A:
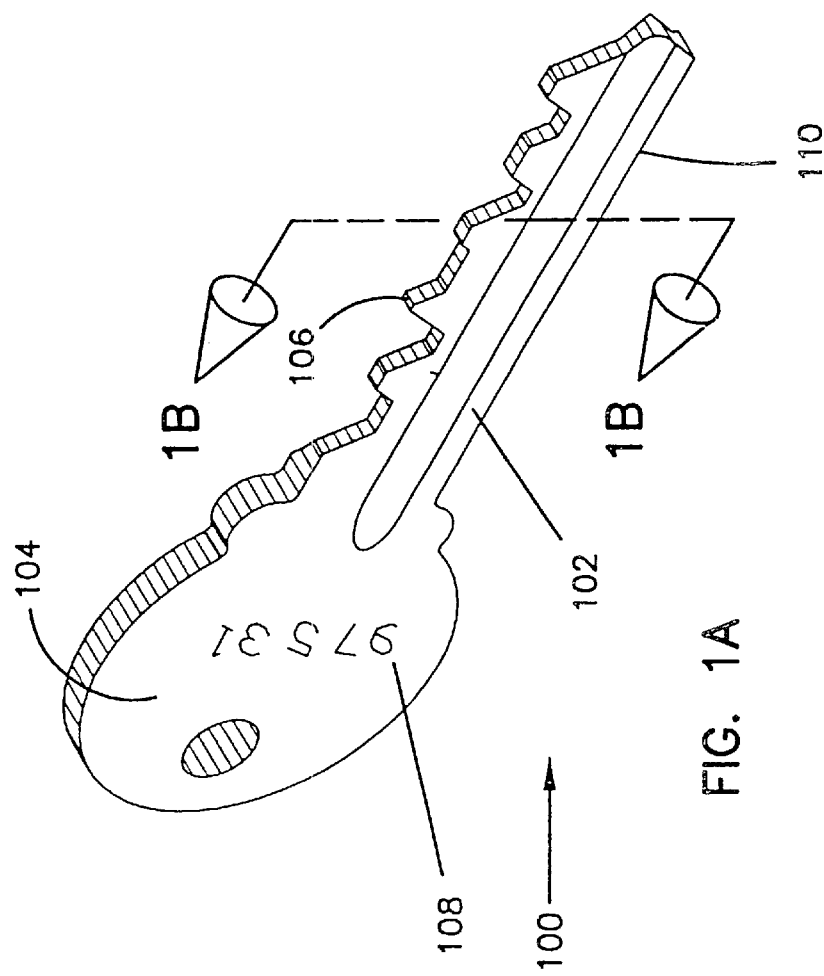
FIG. 1A is a perspective view of a key.

FIG. 1A illustrates the various component parts of a key 100. The key shaft 102 extends from the key bow 104. The key bow 104 is the portion typically held by the user when using the key. The shaft 102 has a keycode 106 along one edge. The bow 104 may be provided with a numerical code 108 that corresponds to the keycode 106.

The cross section of the shaft 102 has a particular shape, known as the keyway 110. The profile of the keyway 110 is illustrated in FIG. 1B, which shows a cross section 1B—1B through the shaft 102. The keyway 110 illustrated includes a notch 112 on a first side of the shaft 102 and another notch 114 and land 116 on the second side of the shaft 102. The notches 112 and 114 and land 116 run the length of the shaft and mate with the aperture of the lock when the key 100 is inserted.

It will be appreciated that the key shown in FIGS. 1A and 1B is only an example of a key and is not intended to limit the scope of the invention in any way. For example, the key 100 may be a double-sided key, in which case the keycode is found on opposite edges of the shaft. Generally, although not always the case, the same keycode is provided on each edge of a double-sided key so that it may be inserted into the lock in either orientation. Additionally, it will be appreciated that keys come with many different keyway profiles. Indeed, it is one of the major problems in the key industry that, due to the large number of different keyways, a large number of key blanks have to be held in inventory.

Figure 2:
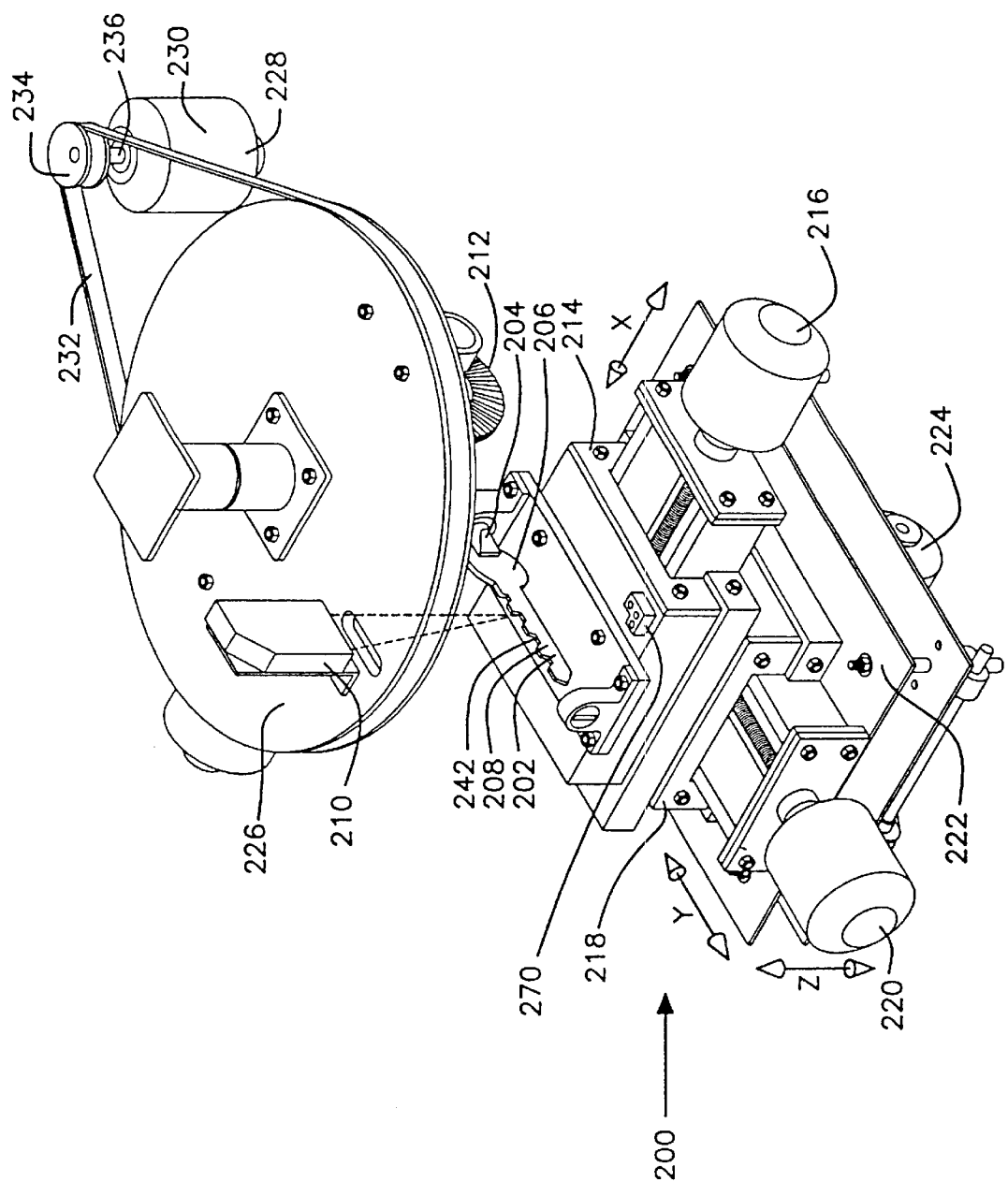
FIG. 2 is a perspective view of a key duplicating apparatus measuring a keycode of a master key in accordance with an embodiment of the present invention.
Figure 3:
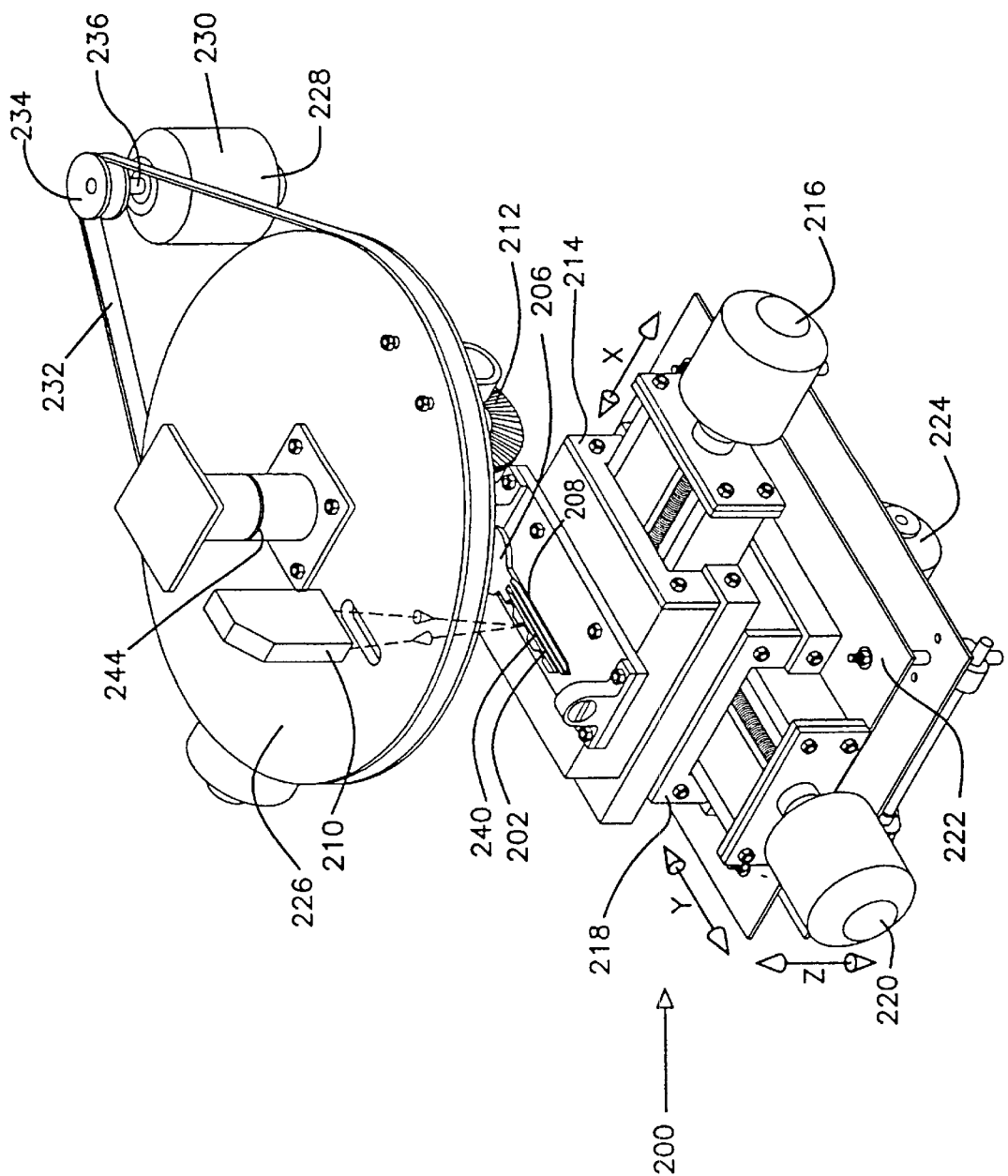
FIG. 3 is a perspective view of a key duplicating apparatus measuring a keyway of a master key.
Figure 4:
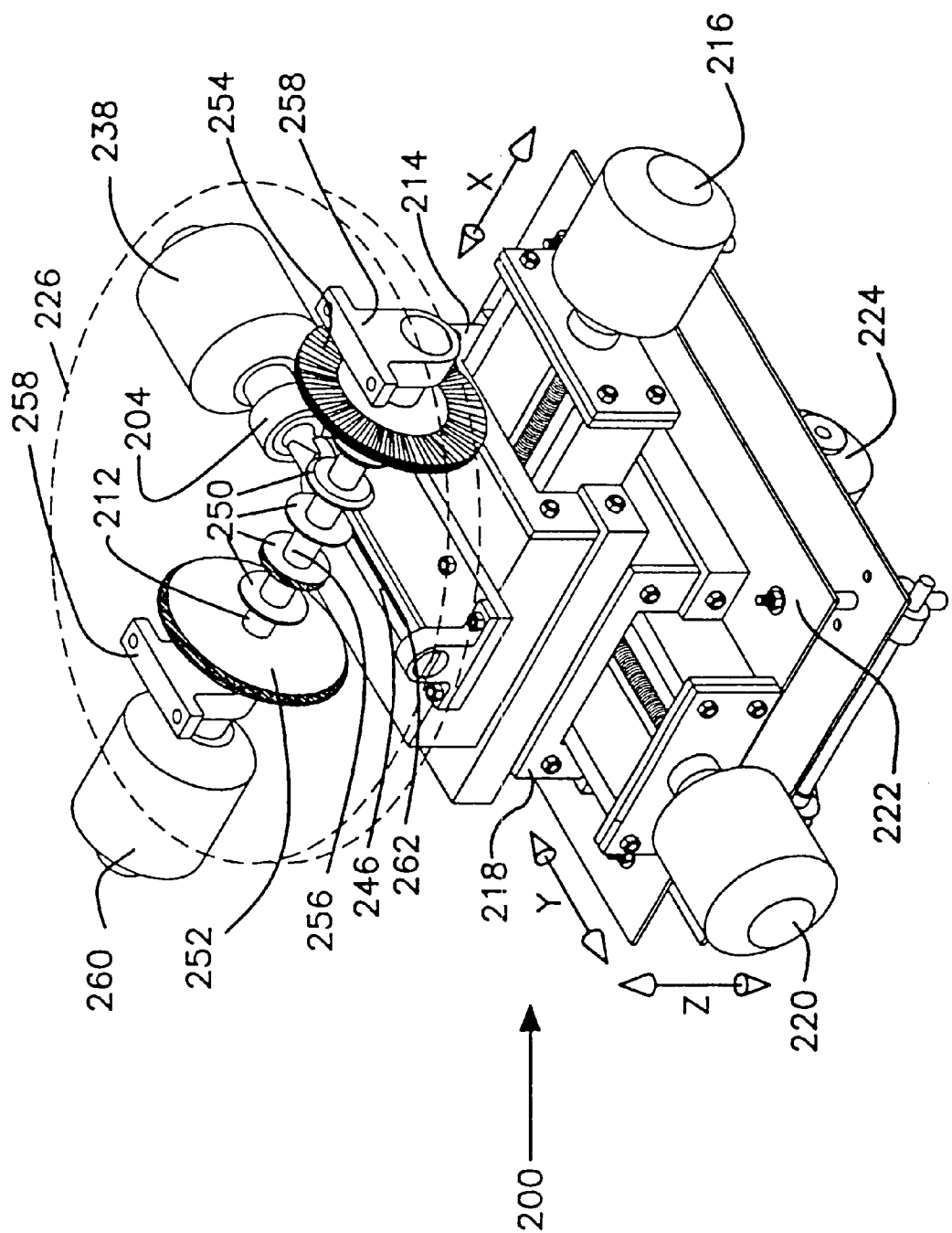
FIG. 4 is a partial perspective view of a key duplicating apparatus cutting a keyway in a blank preform.
Figure 5:
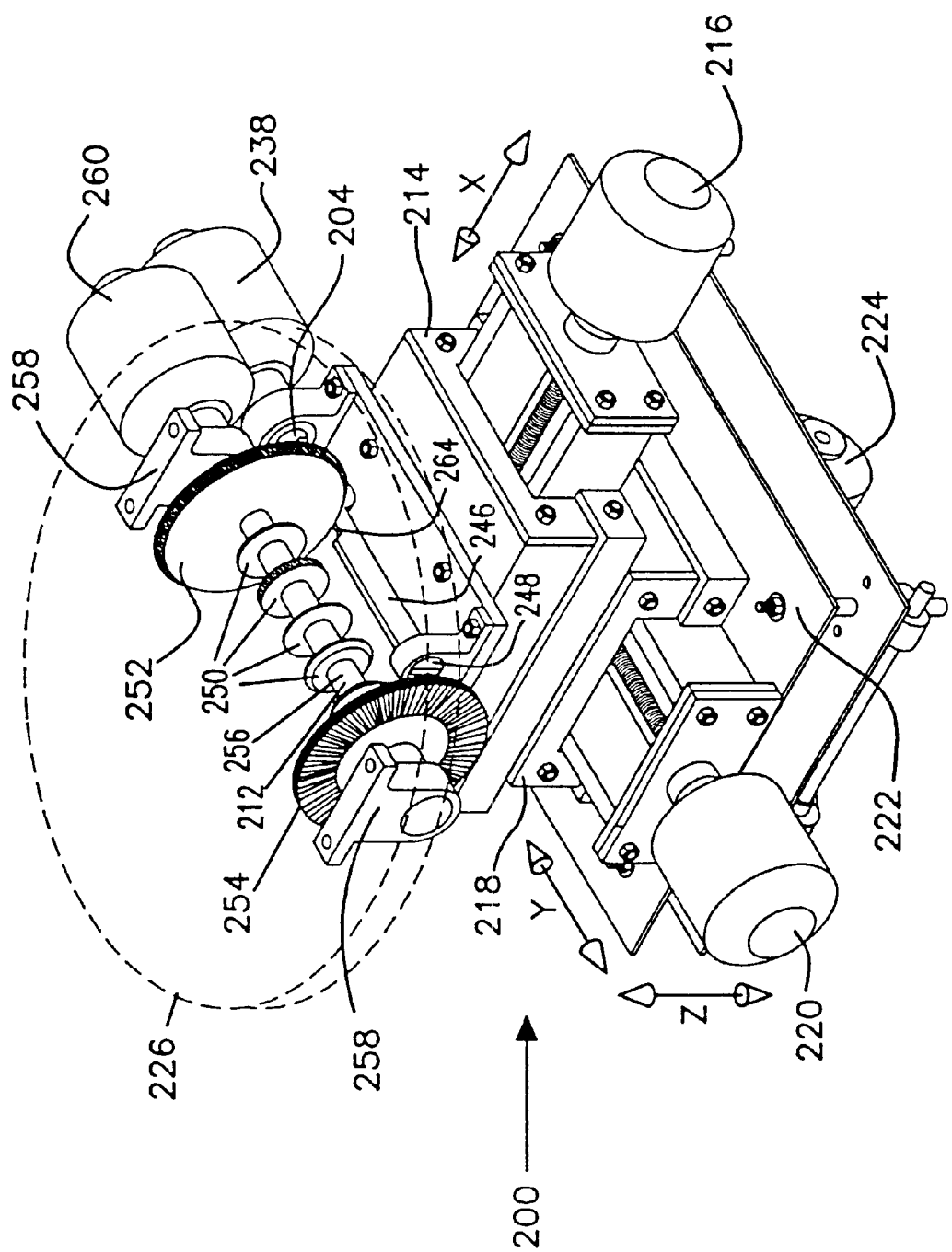
FIG. 5 is a partial perspective view of a key duplicating apparatus cutting a keycode in a blank preform.

FIGS. 2–5 illustrate one particular embodiment of a key-duplicating apparatus 200. FIGS. 2 and 3 illustrate the key-duplicating apparatus 200 in an "original-measuring" mode, in which the original key 202 to be copied is measured for its keycode 242 and keyway 240. FIGS. 4 and 5 illustrate the key-duplicating apparatus 200 in a "key-fabricating" mode, in which a duplicate key is cut from a blank preform 246. The preform 246 is held between the key holder 204 and a tip holder 248.

Referring initially to FIG. 2, a key 202 is held by a key holder 204. The key holder 204 holds the bow 206 of the key 202 so that the shank 208 is accessible by the measuring device 210 and the cutting tool 212. The key holder 204 is mounted on a translation stage 214 that travels in the x-direction. The x-translation stage is driven by a stepper motor 216. The x-translation stage 214 is mounted on top of a second translation stage 218, oriented for translation in the y-direction. The y-translation stage 218 is driven by a stepper motor 220. The y-translation stage 218 is mounted on a third translation stage 222 which provides translation in the z-direction. The z-translation stage 222 is driven by another stepper motor 224. The stepper motors 216, 220, and 224 are controlled by a controller (not illustrated) so that the key can be positioned at any point in x, y, z within the range of travel of the translation stages 214, 218 and 222.

A rotatable platform is positioned above the key holder 204 and the stack of translation stages 214, 218 and 222. The rotatable platform 226 holds the measuring device 210 and the cutting tool 212. The rotatable platform 226 is rotated using a rotator drive 228. The rotator drive 228 is used for rotating the rotatable platform 226 between two positions, namely: a) the cutting tool 212 being perpendicular to the key shank 208, and b) the cutting tool 212 being parallel to the key shank 208. Accordingly, the rotator drive 228 rotates the rotatable platform 226 between two positions, separated by 90°. The rotator drive 228 includes a stepper motor 230 and a drive belt 232 positioned around the periphery of the rotatable platform 226 and a pulley 234 mounted on the shaft 236 of the stepper motor 230.

The key holder 204 is also rotatable, and its rotating motion is controlled by a second rotary stepping motor 238, illustrated in FIGS. 4 and 5. Accordingly, the key 202 may be rotated for measuring either its keycode or its keyway. FIG. 2 illustrates the key 202 oriented with its keycode directed towards the measuring device 210 so that the key-duplicating apparatus 200 can measure the keycode 242 of the key 202.

FIG. 3 illustrates the same apparatus as FIG. 2, except that here the key 202 has been rotated through 90° into position for measurement of the keyway 249 by the measuring device 210.

The rotatable platform 226 is mounted to an apparatus frame (not illustrated) by a rotatable bushing 244.

FIG. 4 illustrates the cutting tool 212, including a number of edge cutters 250 used for cutting the keyway profile, a key-code cutter 252, and a wire brush 254 arranged on a shaft 256. The shaft 256 is supported at either end by shaft supports 258 that are attached to the underside of the rotatable platform 226 (shown in dashed lines in FIGS. 4 and 5). The shaft 256 is rotated by the cutting tool motor 260.

FIG. 4 illustrates the apparatus 200 in a "keyway cutting" mode, with one of the edge cutters 250 forming a groove along the preform 246 to make a keyway 262. The edge cutters 250 are selected so as to provide a variety of shapes of cutter profiles for cutting the keyway 262 into the blank preform 246.

FIG. 5 illustrates the same apparatus as in FIG. 4, but in a "key-code cutting" mode. Here, the blank preform 246 has been rotated through 90° from the position illustrated in FIG. 4. Additionally, the rotatable platform 226 has been rotated through 90° so that the shaft 256 is parallel with the blank preform 246. The blank preform 246 has been brought into position by the x-, y- and z-translation stages 212, 218 and 222 so as to engage the keycode cutter 252 on the edge of the blank preform 246. The blank preform is translated relative to the keycode cutter 252 by the x-, y- and z-translation stages 214, 218 and 222 as the keycode cutter 252 is rotated by the cutting tool motor 260. The keycode 264 is cut into the edge of the key according to the relative movements of the translation stages 214, 218 and 222.

Figure 18:
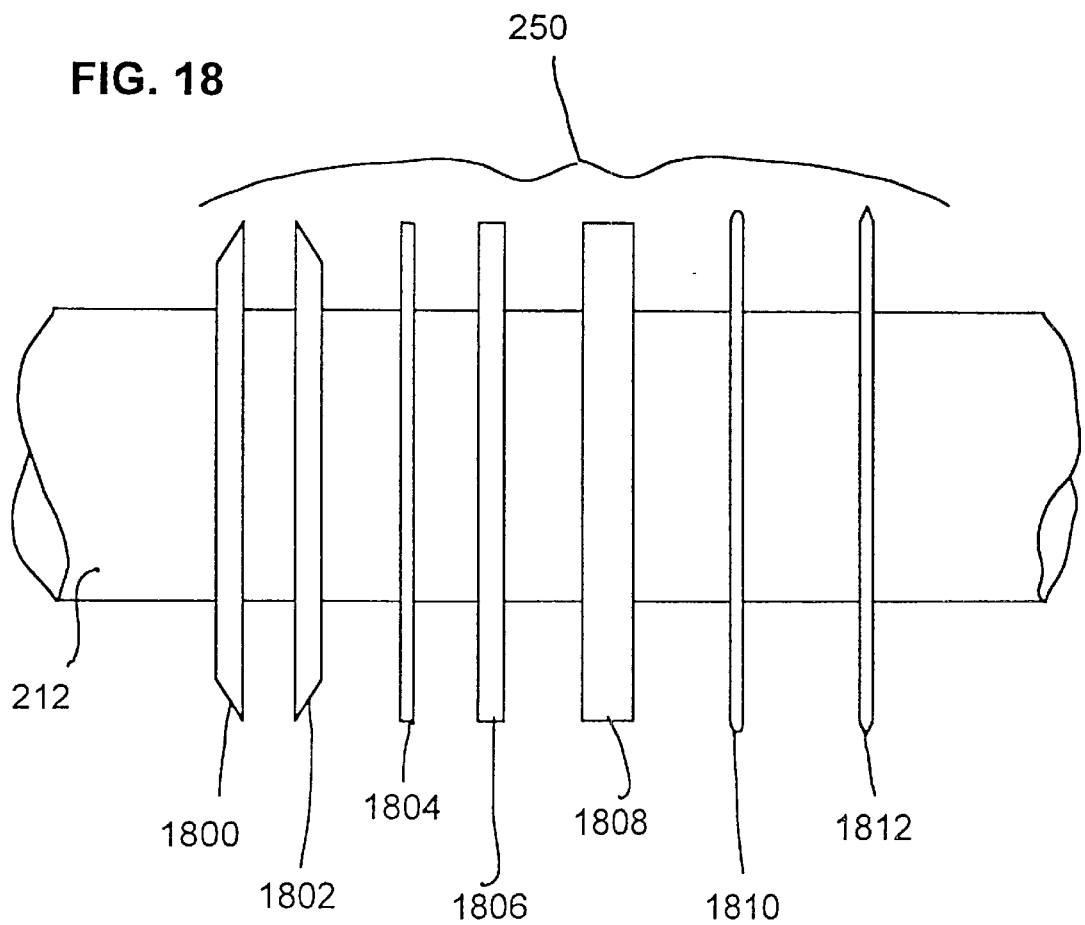
FIG. 18 illustrates a number of cutters used for producing a keyway in a duplicate key.

Different types of edge cutters 250, that may be provided on the shaft 212, are illustrated in FIG. 18. The edge cutters 250 are selected to provide the apparatus 200 with a wide capability for cutting different types of keyway profiles. The right- and left-angled cutters 1800 and 1802 permit angled channels to be cut. Channels having side slopes less steep than the cutters 1800 and 1802 may be cut using a procedure having a series of multiple passes. Use of flat cutters 1804, 1806 and 1808 results in the removal of material leaving a flat finished surface. The flat cutters 1804, 1806 and 1808 are provided in a variety of widths. The narrowest flat cutter 1804 may be used, for example, to cut a flat bottom into a narrow channel. The widest flat cutter 1808 may be used for cutting down large portions of the preform, for example in reducing the original thickness of the preform to the thickness of the original key 202 that is being duplicated. Use of the rounded cutter 1810 results in a rounded channel. Although the rounded cutter has only one radius of curvature, channels having different radii may be formed by controlling the movement of the preform 246 in all three directions x, y, and z while the channel is being cut. The "V" cutter 1812 has a "V" profile to cut a v-shaped channel. The selection of edge cutters 250 illustrated here is not intended to limit the invention. It will be appreciated that additional edge cutters, having shapes different from those illustrated here, may also be employed in forming the keyway.

Figure 6:
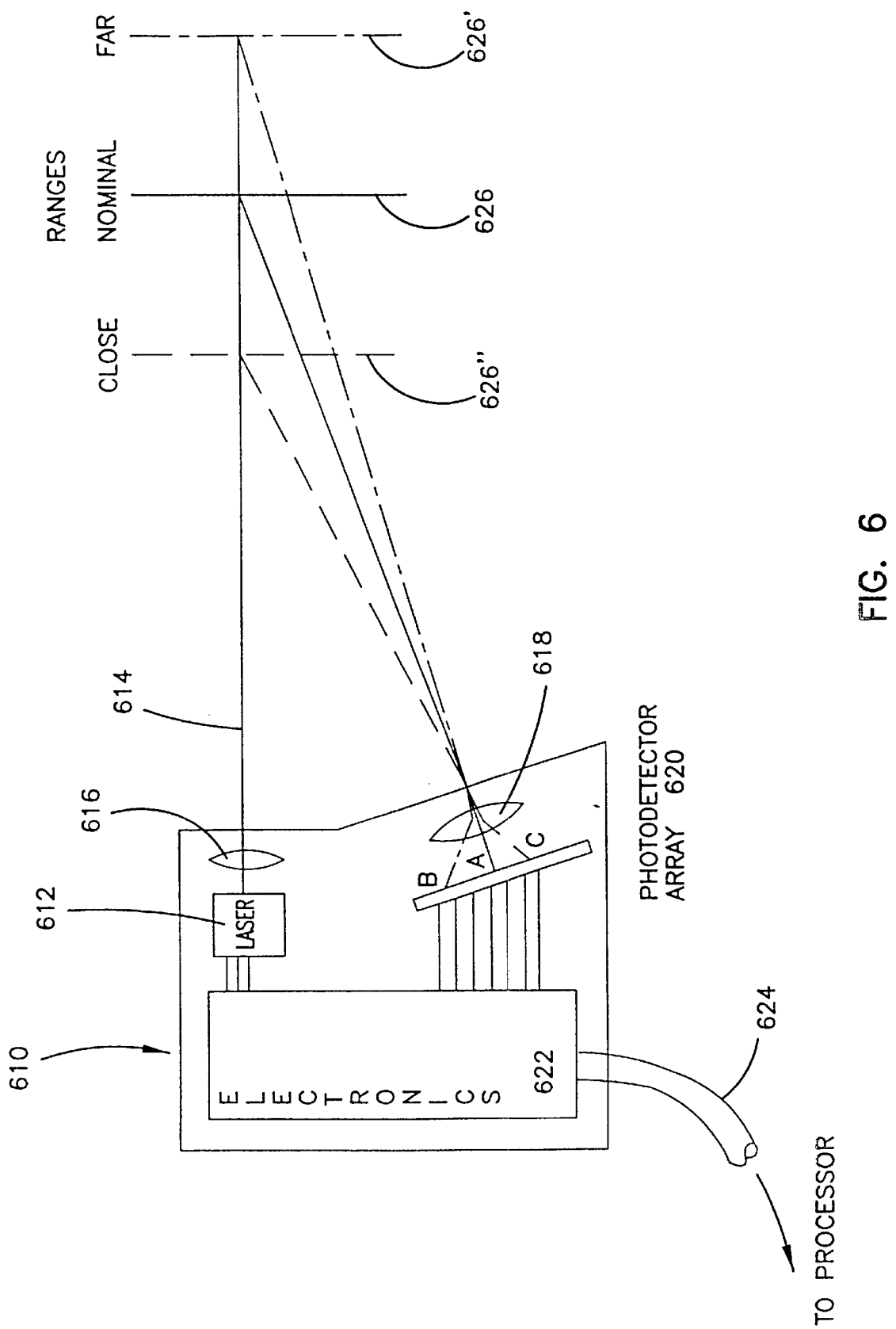
FIG. 6 illustrates an optically based measurement system for use in the key duplicating apparatus.

FIG. 6 illustrates an optically based measuring device for measuring the keycode and the keyway of the key which is to be duplicated. The measuring device 610 employs a laser 612, or other light source, to direct a light beam 614 which is collimated by collimating lens 616. The measuring device 610 includes collection optics 618 for receiving a light beam deflected by a target, and a linear photo-detector array 620 that detects the light collected by the collection optics 618. The laser 612 and the photo-detector array 620 are both coupled to an electronics package 622 which controls the output from the laser 612, and receives the detected signals from the photo-detector array 620. The electronics package 622 may also analyze the detected signals before directing data along communications link 624 to a control processor. The processor may also direct control signals into the measuring device 610 through the communications link 624. It will be appreciated that other detectors, such as a position sensitive optical detector or the like, may be used for detecting a position of the light beam.

The measuring device 610 operates as follows. The collection optics 618 and the photo-detector array 620 receive light deflected (scattered or reflected) from a target which is spaced from the measuring device 610 by a certain distance. If the target 626 is positioned at a nominal distance, then the light deflected by the target 626 and received by the collection optics 618 is consequently directed onto the photo-detector array 620 at position A. If the target 626' is positioned further from the measuring device 610 than the nominal distance, then the light (shown as a dash-dotted line) deflected the target 626' and collected by the collection optics 618 illuminates a different portion of the photo-detector array 620, shown as position B. Moreover, if the target 626' is positioned closer to the measuring device 610 than the nominal distance, then the light (shown as a dashed line) deflected by the target 626 and collected by the collection optics 618 illuminates the photo-detector array at a different position, illustrated as position C. Therefore, by detecting the position on the photo-detector array of the deflected light from the target, the distance to the target may be estimated. In one mode of operation, the position of the target 626 is varied relative to the measuring device 610 until the light collected by the collection optics 618 illuminates the photo-detector array 620 at position A.

In operation, the speed of translation of the translation stages may be adjusted, depending on how far the key 202 is measured to be away from the nominal separation from the measuring device 610. For example, if the key 202 is determined to be relatively far from the nominal separation, then the translation speed may be high. Once the target key is determined to be within a predetermined range of the nominal separation, then the translation speed may be set to be slower, and the translation speed is reduced to zero once the key is at the nominal separation.

A numerical profile of the key 202 corresponding to its physical shape can be constructed by tracking the amount of translation in three dimensions required to achieve the nominal separation between the measuring device 610 and a series of measurement points along the key 202.

Figure 7A:
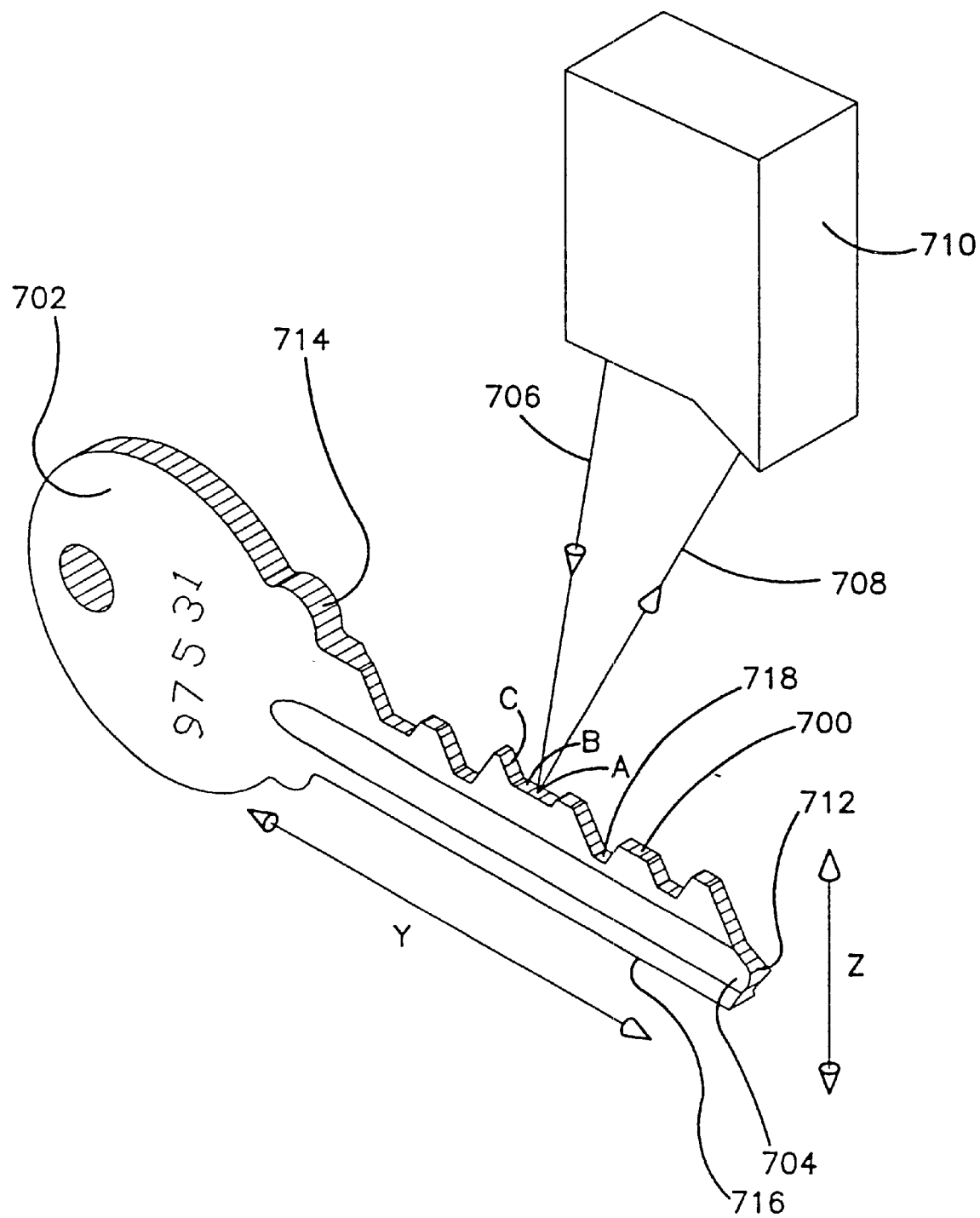
FIG. 7A illustrates an optically based measurement of a keycode.

FIG. 7A illustrates the measurement of a keycode 700 on a key 702 using a light-based measuring device 710. A light-based measuring device 702 uses an optical interaction, such as reflecting, scattering or blocking a light beam, to produce an optical signal that can be used in determining the position of a point on the key 702. It is assumed that the shank of the key 704 is aligned parallel with the y-axis. The measuring device 710 transmits a first light beam 706 to illuminate a spot on the edge of the key shank 704, designated as spot A. The light 708 deflected to the photo-detector 718 is detected by the collection optics and photo-detector array which determines whether point A is at the nominal distance, or either closer or further from the nominal distance. The detected light may be reflected or scattered by the key 702. The position of the key 702 is altered accordingly, to bring position A to the nominal distance. The position of the key 702 is recorded by tracking the movements of the translation states to achieve the nominal separation between point A and the measuring device 710. The key 702 is then translated in the y-direction so that the first light beam 706 illuminates point B, positioned close to point A but spaced by a pre-selected separation in the y-direction. The process of positioning point B at the nominal distance relative to the measuring device 710 is repeated, and the amount of translation in the y- and z-directions required to move position B to the nominal distance are noted. The key is then translated again in the y-direction so that position C is illuminated by the first light beam 706. Again, the key is adjusted in the z-direction to position point C at the nominal distance from the measuring device 710. Again, the amount of translation in y and z to place point C at the nominal distance is recorded. This procedure is repeated over the entire length of the key shank 704, from the tip 712 to the stop 714, so that the whole keycode 700 is measured.

The second edge 716 of the key shank 704 may also be measured. Where the key 702 is single-sided, as illustrated in FIG. 7A, then the measurement along the second edge 716 yields a straight line.

Where the key 702 is a double-sided key, the keycode 700 is provided on either edge of the key shank 704. Moreover, a double-sided key is typically rotationally symmetrical about an axis along the center of the key shank 704 so that the keycodes provided on the edges of the shank are identical and the keyways are the same on both sides of the key 702. The measurement on both edges of the key 716 and 718 provides independent measurements of the keycode 700. It is an important feature of the present invention that since both edges of the key shank 704 are measured, it is possible to duplicate a key where the keycodes cut on either edge are different from each other.

Figure 7B:
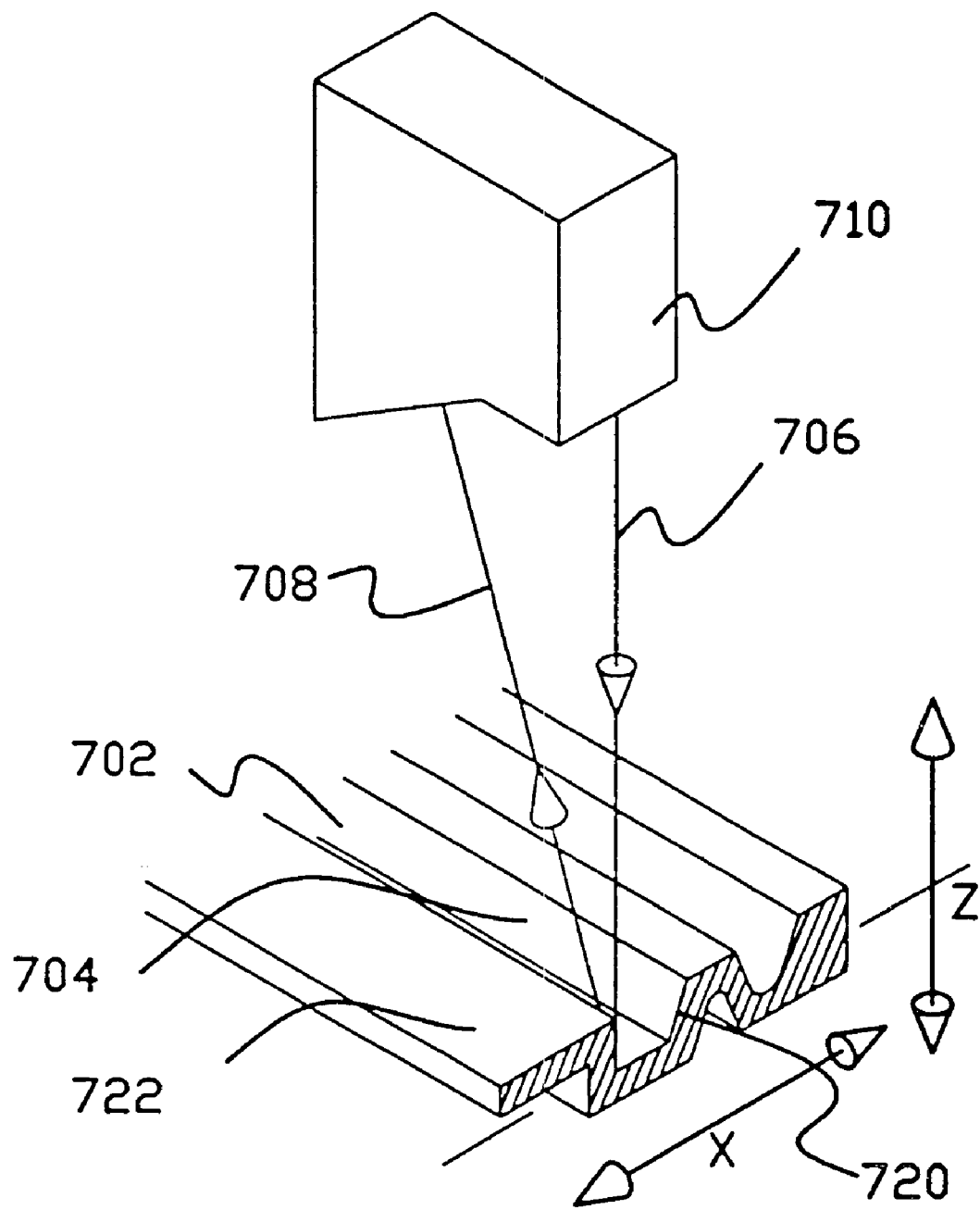
FIG. 7B illustrates an optically based measurement of a keyway.

FIG. 7B illustrates the measurement of a keyway profile on the key 702. The process of measuring the keyway profile 720 is similar to that used in measuring the keycode 700. First, the key 702 is rotated through 90° relative to the orientation used for measuring the keycode 700 so that the measuring device 710 can illuminate portions along the side 722 of the key shank 704. The keyway profile 720 is measured by positioning successive spots across the side 722 of the key shank 704 at the nominal distance from the measuring device 710. The measurement of the keyway profile 720 is advantageously made at the widest portion of the key shank 704 so that measurement of the entire keyway profile 720 is assured. The widest portion of the key shank 704 may be deduced from the measurements of the keycode 700 performed earlier.

In the descriptions of measuring the keycode and the keyway given above, it was assumed that the key shank was parallel to the y-axis, and that the side 722 of the key 702 lay parallel to the x-axis. It will be appreciated that the key 702 may not always be aligned exactly with the axis of the translation stages. However, it will also be appreciated that any deviation from such alignment may be accounted for in the software driving the translation of the translation stages. Thus, in the measurement of both the keycode and keyway, the key 702 may be translated in all three directions —x, y and z—to perform the measurement.

It will be appreciated that other optical methods may be used to measure the profile of the key 702. For example, rather than detecting light deflected by the key surface, a detector may be positioned on a side of the key 702 opposite from the light source. A point on the keycode may then be detected by moving the key across the light beam so as to cut off the light beam passing to the detector, and recording the positions of the translation stages when the beam is cut off. This may be performed for a number of points along the keycode, so as to "map" the profile of the keycode.

Figure 7C:
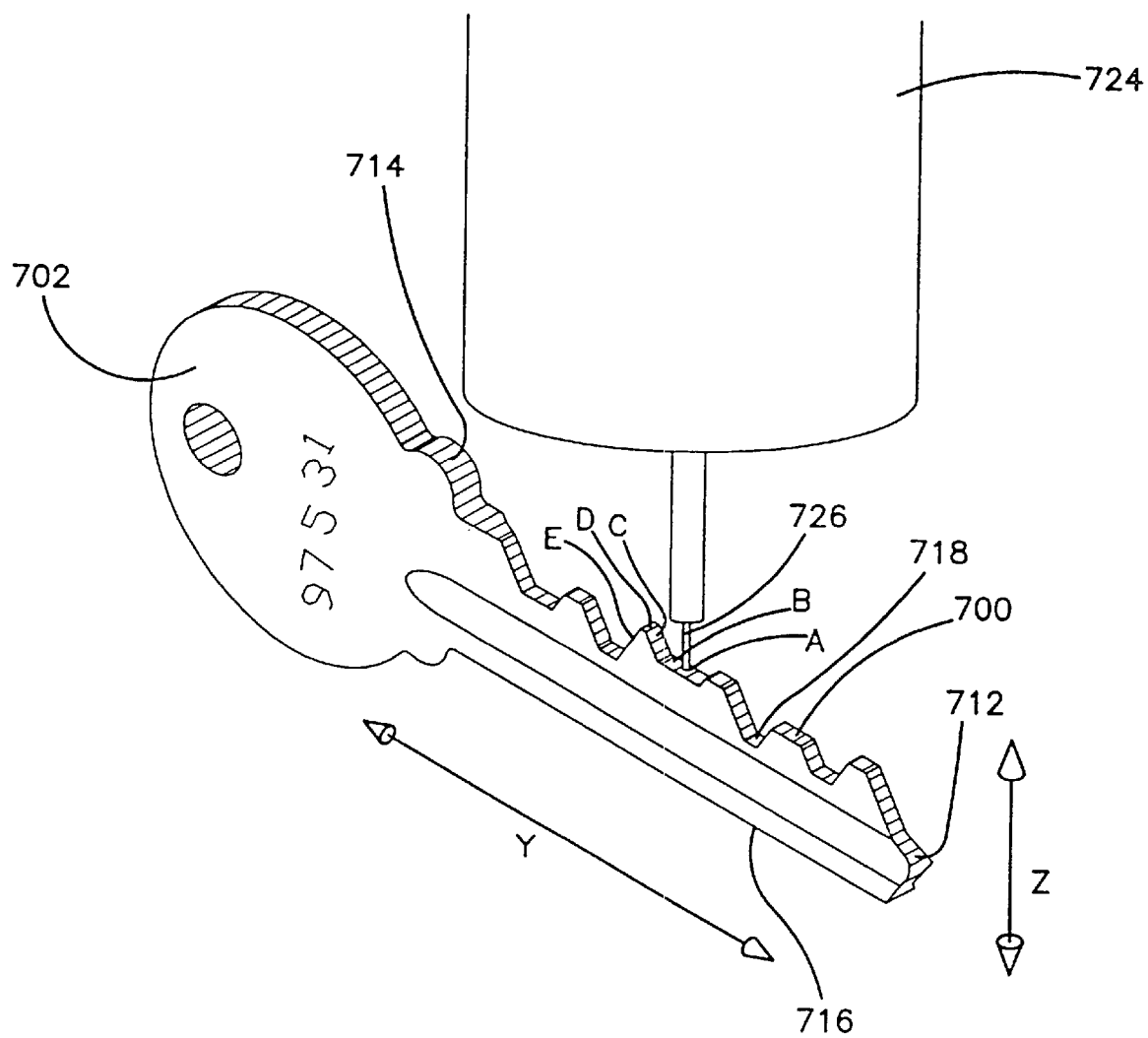
FIG. 7C illustrates a mechanically based measurement of a keycode.

It will also be appreciated that the keycode 700 and the keyway 720 of the key 702 may be measured using other methods. One such method is illustrated in FIG. 7C, where the keycode 700 is measured using a mechanical follower 724. The mechanical follower 724 has a small tip 726 that is sensitive to a force applied when brought into contact with the key edge 718. The steps for measuring the keycode 700 are similar to those discussed regarding the light-based measuring device, where a series of points along the edge 718 of the key 702 are brought into a specific position in three-dimensional space by adjusting the translation stages on which the key is mounted. The specific position in three-dimensional space is defined by the tip 726 of the mechanical follower 724.

Figure 7D:
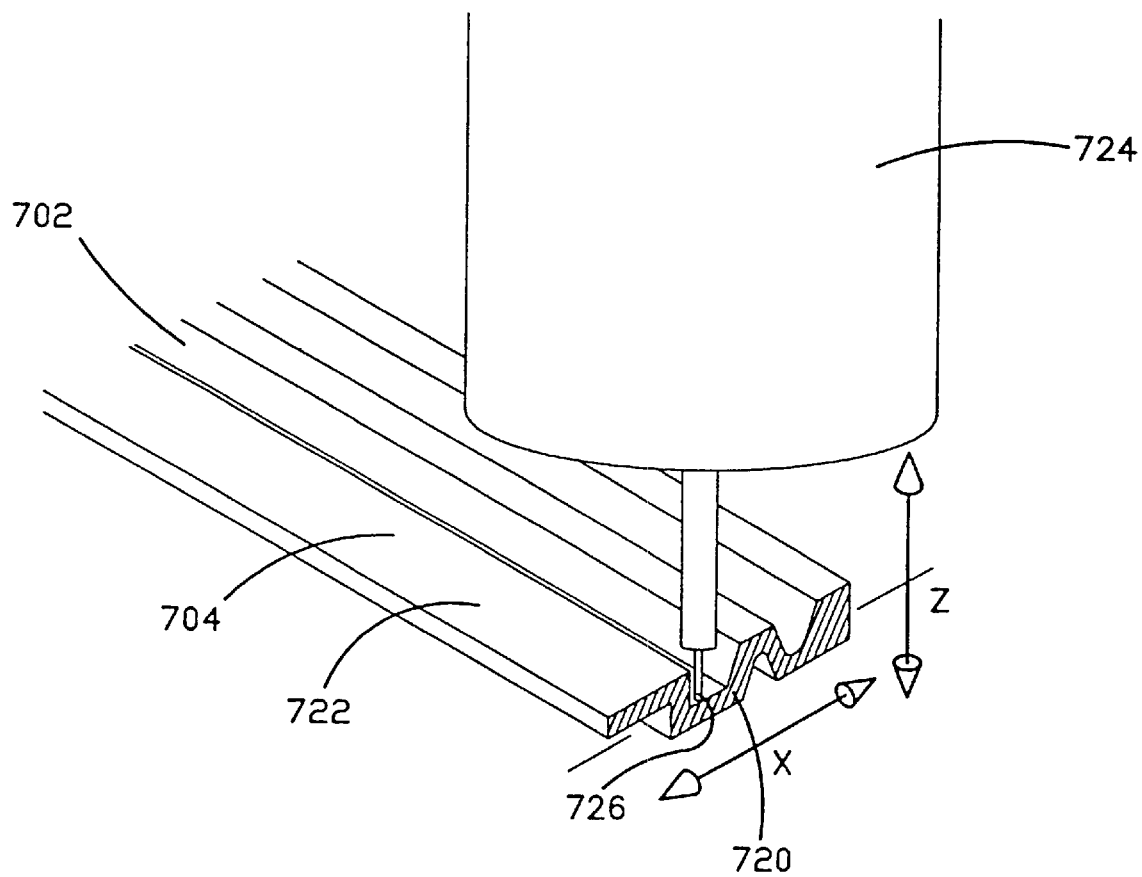
FIG. 7D illustrates a mechanically based measurement of a keyway.

FIG. 7D illustrates the mechanical follower 724 in use for measuring the keyway profile 720 of the key 702. Like the keycode measurement of the previous figure, the tip 726 of the mechanical follower 724 defines a point in three-dimensional space to which a series of positions across the shaft 704 of the key 702 are brought into contact. By measuring the displacement in x, y and z, the keyway profile 720 can be measured. As with the measurement of the keyway profile 720 using the light-based measurement system 710, both sides of the shank 704 are measured to produce a complete keyway profile.

Figure 8:
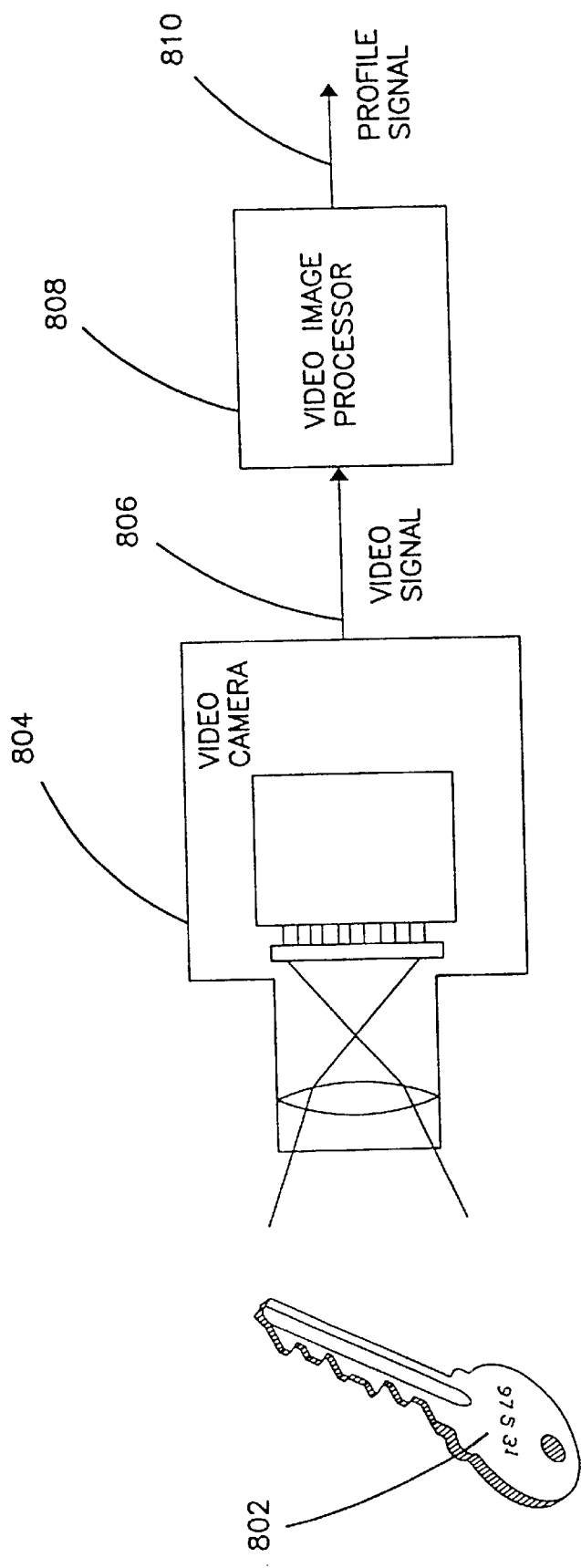
FIG. 8 illustrates the measurement of a key using a video technique.

FIG. 8 illustrates an embodiment of a measuring device that utilizes a video camera for measuring the profile of a key 802. An image of the key 802 is recorded by the video camera 804, which converts the optical image into a video signal. The video signal is transmitted on the video line 806 to the video image processor 808. The video image processor 808 converts the received video signal into key profile data using, for example, a pattern recognition technique. The key profile data contain information on the dimensions and shape of the key imaged in the camera 804. The key profile data are then converted into a series of motion control signals to control the movement of the translation stages for cutting the duplicate key.

This video approach to key measurement may provide all the required profile information using two images, one image taken from the side of the key 802 as illustrated to provide keycode information, and the other image taken of the key tip 812 in a direction along the axis of the key 802 to give keyway information. It will be appreciated that a video measurement system requires the video camera 804 and the key 802 be movable relative to each other in such a way as to permit side-on and end-on views to be taken. Thus, a video camera could be mounted on a rotating mount, for example, to allow an image to be taken of the side of the key 802 and the end of the key 802, while the key 802 remains stationary, or two fixed mount cameras 804 could be employed in orthogonal orientations.

Figure 9:
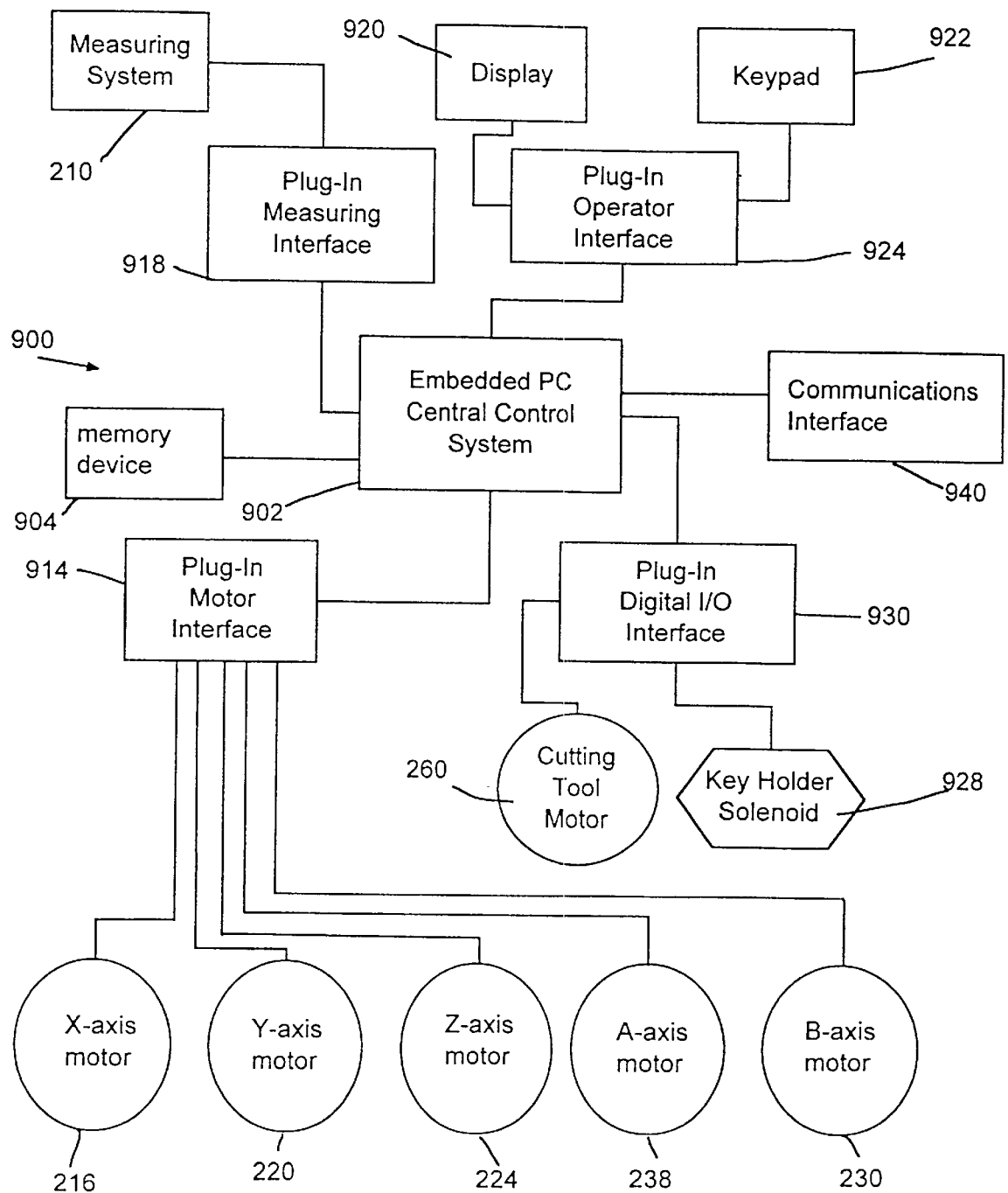
FIG. 9 is a block diagram schematic of a control system for a key duplicating apparatus.

FIG. 9 illustrates a block schematic of an embodiment of a control system for the key-duplication apparatus that may be used to control the embodiment of the duplicating apparatus illustrated in FIGS. 2–5. In this particular embodiment, the control system 900 is based on an embedded PC central control system 902 having a number of plug-in interfaces for interfacing with various subsystems of the apparatus. The control system 902 may include a memory device 904, such as a read only memory, erasable read only memory, magnetic tape or disk, CD-ROM, or the like for storing information.

The central control system 902 controls several motors 216, 220, 224, 230, and 238 via the plug-in motor interface 914. The x-axis stepper motor 216 controls the x-position of the key and the blank preform. The y-axis stepper motor 220 controls the y-position of the key and the blank preform, and the z-axis stepper motor 224 controls the z-position of the key and the blank preform. The a-axis stepper motor 238 controls the orientation of the key 202 and the blank preform 246 in the key holder 204, so that an edge or a flat surface is presented to the key-duplication apparatus 200 for measurement or cutting. The b-axis motor 230 controls the rotational position of the cutting tool 212 so that the cutting tool 212 can cut either parallel or perpendicular to the axis of the key shank or the axis of the blank preform 246.

The measuring system 210 is coupled to the central control system 902 via the plug-in measuring interface 918. The measuring system 210 transmits measurement data to the central control system 902 during measurement operations. For example, while measuring the keycode of a key, the measuring system 210 transmits information to the central control system 902 related to the relative position of the point on the key being measured to the nominal position. The central control system directs the x-, y- and z-axis motors 216, 220 and 224 accordingly to move the measurement point on the key into the nominal position. The motor interface 914 may also relay step completed information to the control system 902 so that the control system 902 maintains tracking of the position of the stepper motors 216, 220, 224, 230 and 238.

A user may interact with the apparatus via a display 920 and a keypad 922, which are interfaced with the central control system 902 via the plug-in operator interface 924. The display 920 is used for displaying information to the user concerning, for example whether or not the submitted key can be duplicated. In turn, the user may enter data, information or commands to the central control system 902 via the keypad 922. Such information or commands may include how many duplicate keys are to be produced from the submitted original key.

Other subsystems controlled by the central control system 902 include the cutting tool motor 260 and the key holder solenoid 928, which are controlled via the digital I/O interface 930. The central control system 902 controls the speed and direction of the cutting tool motor 260 according to the type of operation. For example, the cutting motor may operate at slower speeds for cutting the keyway profile than for the cutting the keycode, since there is typically more material to be removed when cutting the keyway than when cutting the keycode. Also, when deburring with the wire brush, the cutting tool motor 926 may be operated at a higher speed than during a cutting operation, and in both directions. The key holder may be operated by a solenoid 928 so as to automatically grip and release the key and blank preform from the holder.

A communications interface 940 is connected to the control system 902 which provides for communication with external sources. For example, the communications interface 940 may include a telephone modem that permits the control system 902 to receive information on the shape and dimensions of standard keycode elements from key manufacturers, or to receive a listing of known key types (combinations of keyway and keycode) that have been reported to be stolen.

Figure 10:
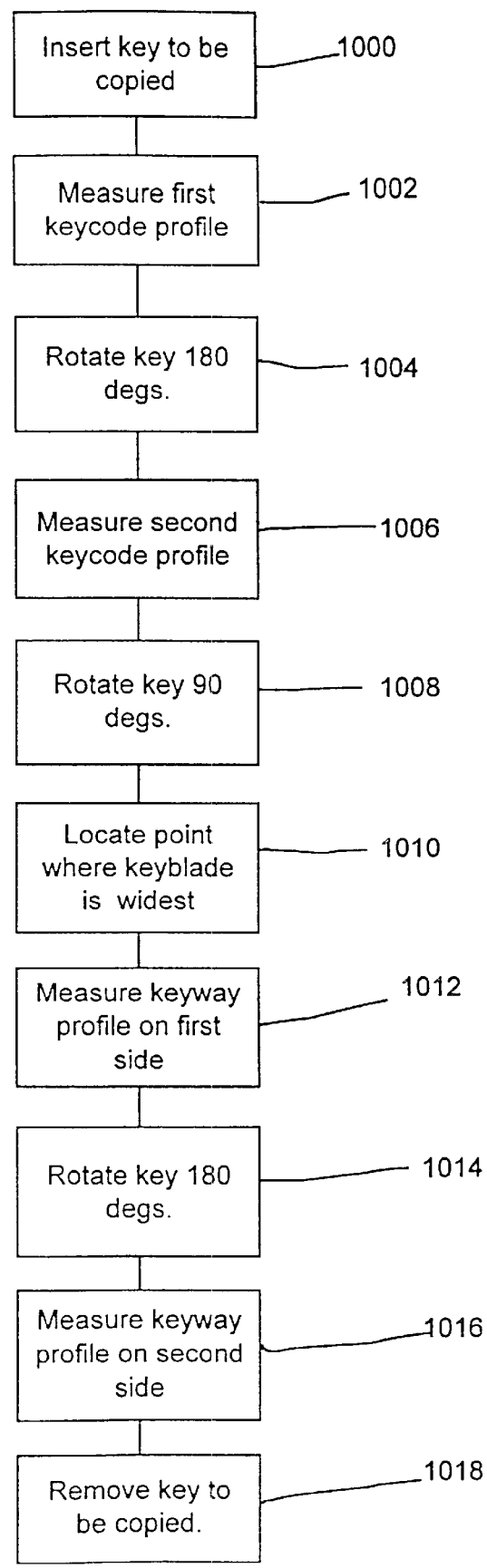
FIG. 10 lists process steps for measuring an original key.

A list of process steps for measuring a key are provided in FIG. 10. Initially, the key 202 that is to be copied is inserted in the key holder 204, at step 1000. The first keycode 242 is measured along the first edge of the key 202, at step 1002. The key 202 is then rotated through 180° in the key holder 204 to expose the second edge of the key 202 to the measuring system 210, at step 1004. The keycode profile of the second edge of the key 202 is then measured, at step 1006. Measurement of both edges of the key 202 provides information for the subsequent cutting process. An advantage of measuring the opposite edges, or the opposite sides, of the key 202 is that the controller 900 may determine if the key 202 is held in the key holder 204 with the longitudinal axis of the key parallel to a translation axis of the apparatus 200, or whether there is an angle between the key axis and the translation axis. The determination of such an angle permits the controller 900 to include the angle in subsequent analysis of the measurement data and development of cutting instructions. However, the operator may also indicate to the controller 902 that the key is single-sided, for example via the operator interface 904, thus ordering the apparatus to measure only the first edge of the key 202.

After measuring the keycodes, the key 202 is then rotated through 90° in the key holder 204, at step 1008, thus exposing the first side of the key to the measuring system 210 so that the keyway on the first side may be measured. Next, the controller 902 determines from the measurements of the keycodes where the widest point of the key blade is located, and the measurement system 210 is positioned at the widest point, at step 1010. This ensures that subsequent measurements of the keyways on either side of the key 202 include the complete keyway. Next, the keyway profile of the first side of the key 202 is measured, at step 1012. The key 202 is then rotated through 180° to expose the second side of the key 202 to the measuring system 210 at step 1014. Next, the keyway profile on the second side of the key 202 is measured, at step 1016. The key 202 may then be removed from the key holder 204, at step 1018.

Figure 11:
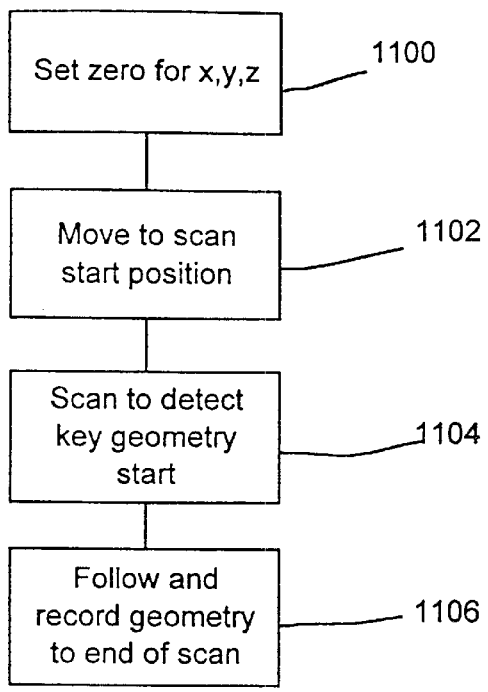
FIG. 11 lists process steps for measuring a keyway or a keycode.
Figure 12:
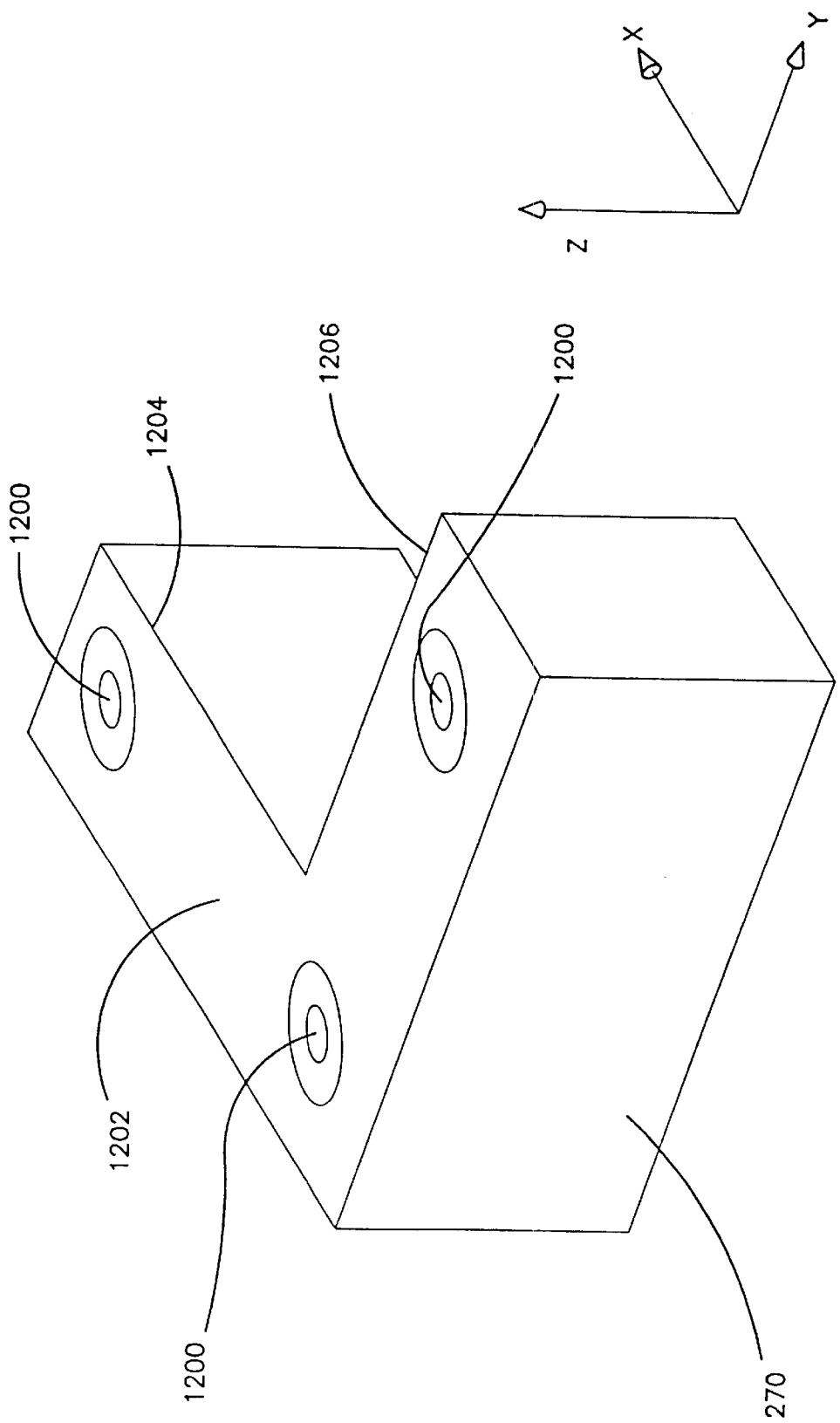
FIG. 12 illustrates a system calibration standard block.

A sequence of steps for making a measurement of a keycode or keyway is provided in FIG. 11. At the start of the sequence, the apparatus 200 is calibrated by setting the positions of the translation stages 214, 218, and 222 at a fiduciary zero for all three axes, x, y, z, at step 1100. The zeroes are set for each axis by setting the measurement 210 to locate the x-axis, y-axis, and z-axis zero steps on the system calibration standard block 270, illustrated in FIG. 2. This block is shown in greater detail in FIG. 12. The block 270 includes a number of bolt holes 1200 to receive bolts so that the block 270 can be firmly attached to the x-translation stage 214. The upper surface 1202 of the block 270 acts as the z-axis zero reference. The block also has two edges 1204 and 1206 which act as x- and y-axis reference zeroes, respectively. The initial zeroing of the apparatus 200 is performed by locating the zero surfaces and edges of the block 270 using the measuring unit 210.

The x- and y-axes are zeroed when the measuring unit detects their respective zero-edges 1204 and 1206. The z-axis is zeroed on the top surface 1202 of the block 270.

The machining axes, x, y, and z, are provided with end-of-travel motion limit switches. The calibration block is located just inside the limits of the x, y, and z travel and is initially found by first slewing each axis to its respective zero end limit switch, then stepping off the switch until the measuring unit 210 detects the appropriate reference edge or surface of the block 270. Thus, the zeroes for each axis are located close to the end of the travel on each axis.

The two rotary axes are stepped in one direction until their zero limit switch is encountered, and then stepped away to the point of signal loss.

After the zeroes have been set, the x, y, and z translation stages 214, 218, and 222 are slewed to locate the beginning point for the first scan, at step 1102. The scan start position is located outside of the maximum expected envelope of space for the key geometry to be measured, and may be simply a point in space relative to the zeroed point.

The scanning translation stages are slewed to detect where the key geometry starts, at step 1104. One or more of the translation stages 214, 218, and 222 is slewed until the measuring unit 210 detects the presence of a key surface. Then the z-axis is advanced or retracted to null the scan standoff distance, i.e., to set the nominal separation between the key surface and the measuring unit 210. The distances from the previously set zeroes traveled by the translation stages 214, 218, and 222 are recorded.

Next, the geometry of the key is followed and recorded up to the end of that particular scan, in step 1106, using the step and repeat process described above with regard to FIGS. 7 and 8. From the geometry-start position obtained in step 1104, the scanning axis is stepped to scan to the next position to be measured. Holding the scan at the reference position, the z-axis is stepped up or down to achieve the nominal separation from the measuring unit. The axis positions are recorded. A new reference position is found and the translations of each translation stage 214, 218, and 222 are recorded. The axis positions thus recorded represent a digitized form of the key shape that has been scanned, offset by the z-axis stand-off distance.

Figure 13:
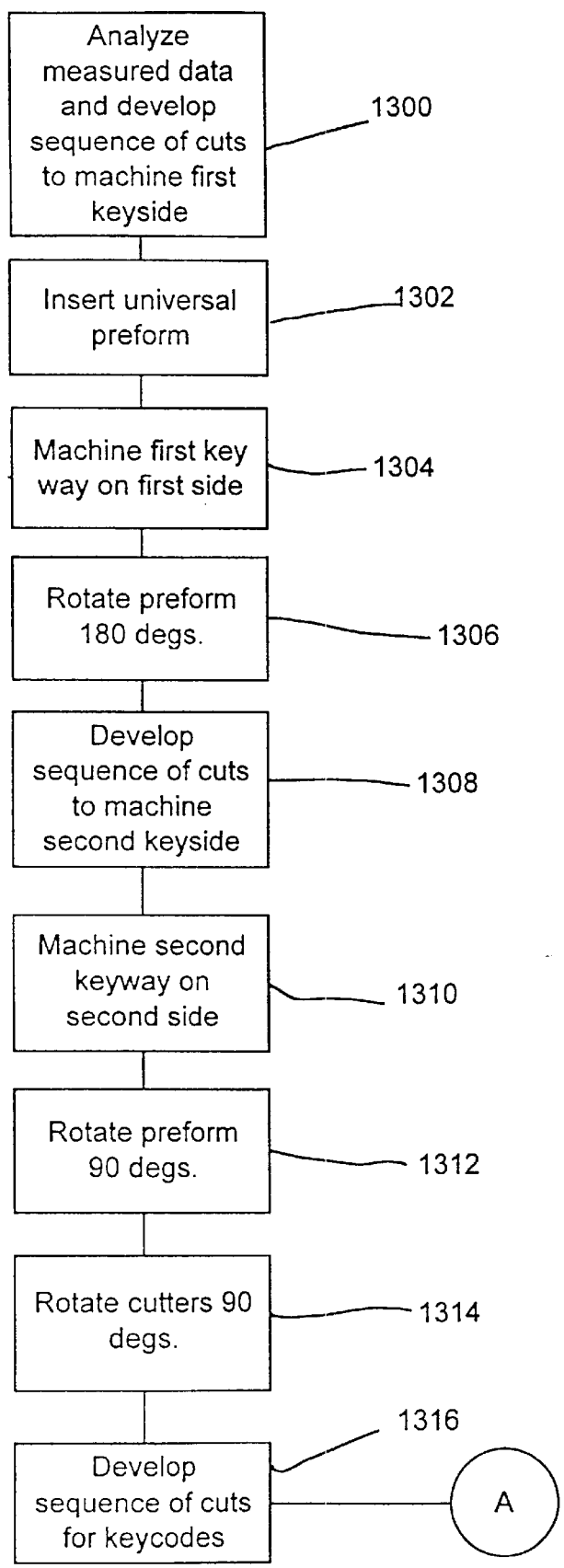
FIGS. 13 and 14 list process steps for forming a duplicate key.
Figure 14:
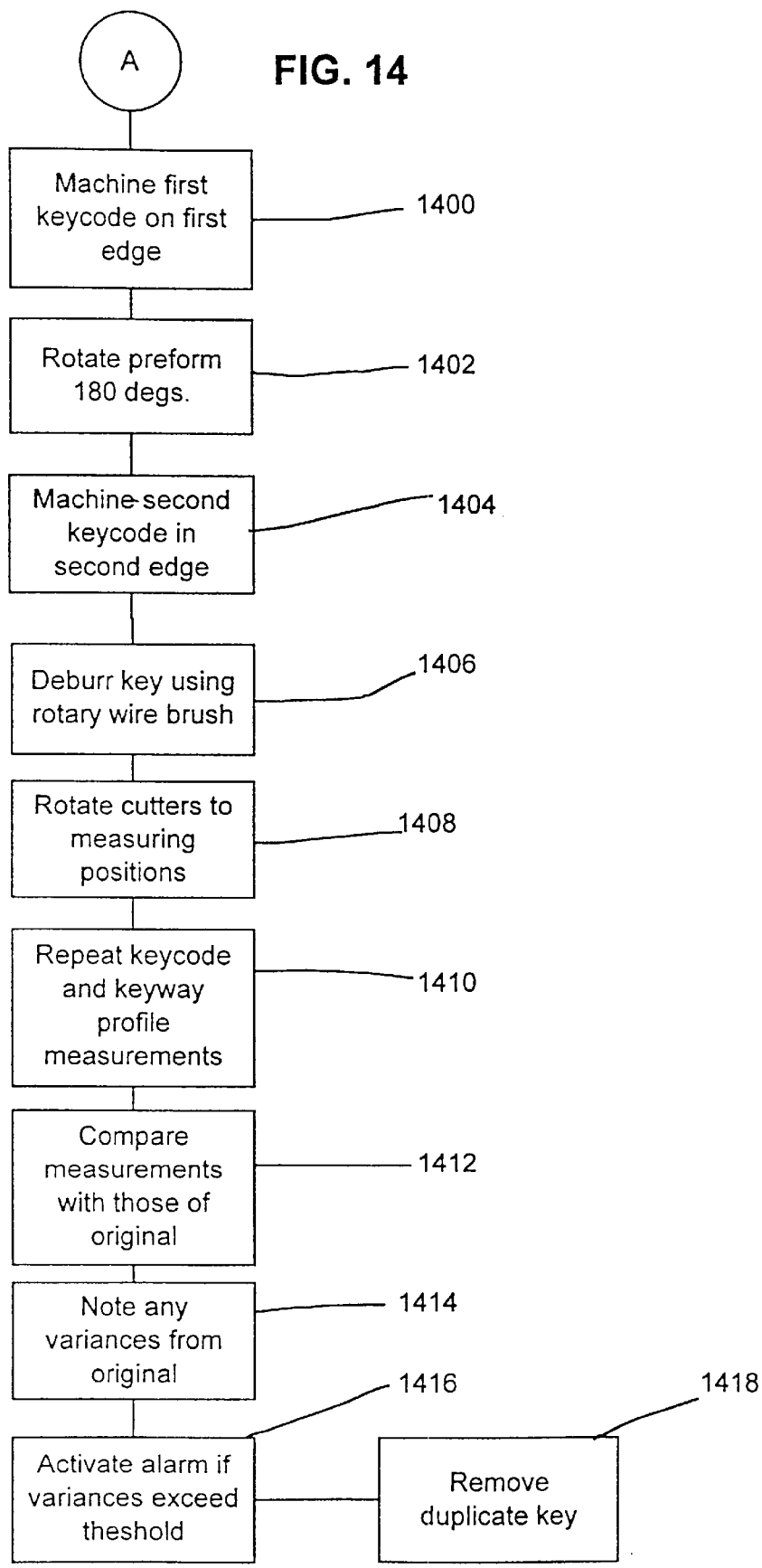

A sequence of steps for machining a duplicate key using the measurements of the original key are listed in FIGS. 13 and 14. First, the data measured from the original key are analyzed and a sequence of cuts for forming the duplicate key is developed in step 1300, for machining the first side of the preform 246. The preform is inserted into the holder 204 and held at its far end by the tip holder 248, in step 1302. The keyway on the first side of the preform 246 is machined using the edge cutters 250, in step 1304. The preform 246 is then rotated through 180°, in step 1306. If not already done, the sequence of cuts for forming the second keyway on the second side of the preform 246 is developed, in step 1308. The second keyway on the second side of the preform 246 is then machined using the edge cutters 250, in step 1310. The preform 246 is then rotated through 90°, in step 1312, to expose a first edge to the keycode cutter 252. Also, the platform 226 is rotated through 909, in step 1314 so that the shaft 212 lies parallel to the preform 246, and the keycode cutting tool 252 is correctly oriented relative to the preform 246.

If not already done, numerical instructions for cutting the keycodes on the preform 246 are developed in step 1316. The first keycode is machined on the first edge of the preform 246, at step 1400. The preform 246 is then rotated about its axis by 180° to expose the second edge to the keycode cutter 252, in step 1402. The second keycode is then machined on the second edge of the preform at step 1404. The second keycode pass may be only for cutting the backside edge of a single sided duplicate. In forming the keycodes, the machined preform 246 may be separated from its tip held in the tip holder 248.

After all the cutting operations are over, the machined preform represents a duplicate of the original key. The duplicate key is deburred, in step 1406, using the wire brush 254 to remove any burrs or cuttings, and to soften any sharp edges which may be dangerous to a user.

Next, the platform 226 is rotated back into position, which permits measurements to be made of the duplicate key, in step 1408. The keycodes and keyways of the duplicate key are measured, in step 1410, and compared with those of the original key 202, in step 1412. Any variances between the two measurements are noted, in step 1414, and a flag is set, in step 1416, if the variances in measurement between the original key 202 and the duplicate key exceed a predetermined threshold, for example a few thousandths of an inch. Any variances thus measured may be indicative of wear on the key-duplicating apparatus 200: this is discussed further hereinbelow. The duplicate key is then removed from the apparatus, at step 1418.

Figure 15:
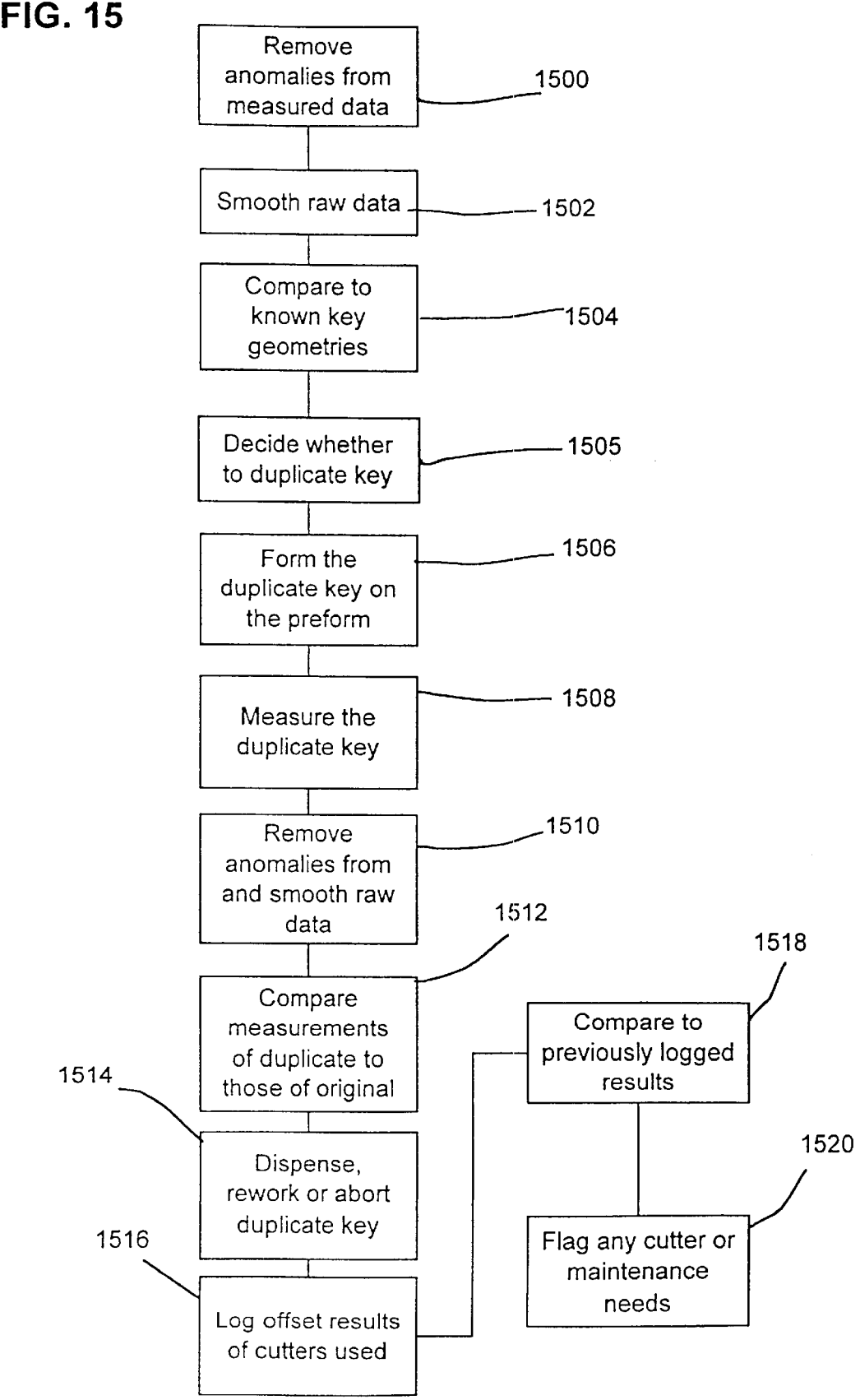
FIG. 15 lists process steps for analyzing measured key profile data.

A sequence of steps for analyzing measured key profile data are provided in FIG. 15. First, any anomalies or glitches present in the data measured from the original key are removed, in step 1500. This is done using generalized key-shape knowledge to remove any possible abnormal details that the measuring unit 210 might generate in error. Next, the raw data are smoothed, in step 1502, using a smoothing algorithm to mathematically smooth the scanned data.

Next, the measured key shape is compared to known key geometries, in step 1504. Here, the measured key shape is compared to stored, known key-shape data, for example, as supplied by key manufacturers, to determine if a match might exist. Key-shape data may be downloaded to the apparatus 200 via a telephone or other communications link through the communications interface 940, or may be stored locally in the memory device 904. These data may include key shapes of high security keys whose duplication is forbidden, or combinations of keyway profiles and keycodes for keys that have been reported to be lost or stolen. In step 1505, a decision is then made, based on the results of the comparison in step 1504, on whether or not to duplicate the measured key. For example, if the measured key is shown to be close to a standard key shape provided by a key manufacturer, the shape of the standard key may be used for the instructions for cutting the duplicate, rather than the measured data, since the measured key may be worn and may no longer retain the same shape and size as when new. Also, if the measured key is determined to be lost or stolen, a signal may be directed through the communications interface 940 to another location, such as a manufacturer's information desk or the police.

The duplicate key is then formed on the preform 246, in step 1508, using the measured, de-glitched, and smoothed data to machine the duplicate. The duplicate key is then measured in step 1508 and the anomalies removed and the raw data smoothed, in step 1510.

The measurements of the duplicate key are compared with those of the original key 202, in step 1512. A decision on whether to accept the duplicate key, rework the duplicate key or abort the duplicate key is made in step 1514. This decision is made on the results of the comparison in step 1512. If the measurements of the duplicate key are acceptably accurate in comparison with the measurements of the original key 202, then the duplicate key is deemed to be acceptable. A flag may be set to indicate if the duplicate key is to be aborted. A new preform may then be loaded into the holder 204 and tip holder 248 and a new duplicate key cut. The offset between the measurement results for the original key 202 and the duplicate key are logged, in step 1516, along with a listing of which edge cutters 250 were used in cutting the keyways on the preform 246. It will be appreciated that the edge cutters 250, the keycode cutting tool 252, and the motion system, including the translation stages 214, 218, and 222, may wear with use. Such wear can be compensated for in gradual increments by keeping a record of the machine and specific cutting performance after each use.

The logged results are compared to previously logged results in step 1518. By comparing the results after each usage to previous results, sudden changes in system performance can be discovered. By comparing the present results to older or average data, the controller can make decisions on how to gradually compensate for machine or cutter wear.

Any cutter or machine maintenance needs are flagged, in step 1520, for example, by sending a message to the display 920 or through the communication interface 940 to a maintenance desk. When the gradual compensation discussed with regard to step 1518 reaches certain preset limits, the particular cutter or machine element showing excessive offset or error is flagged for future repair or replacement. This maintenance status log may be available for uploading to a central monitoring station, or displayed on the display 920.

Figure 16:
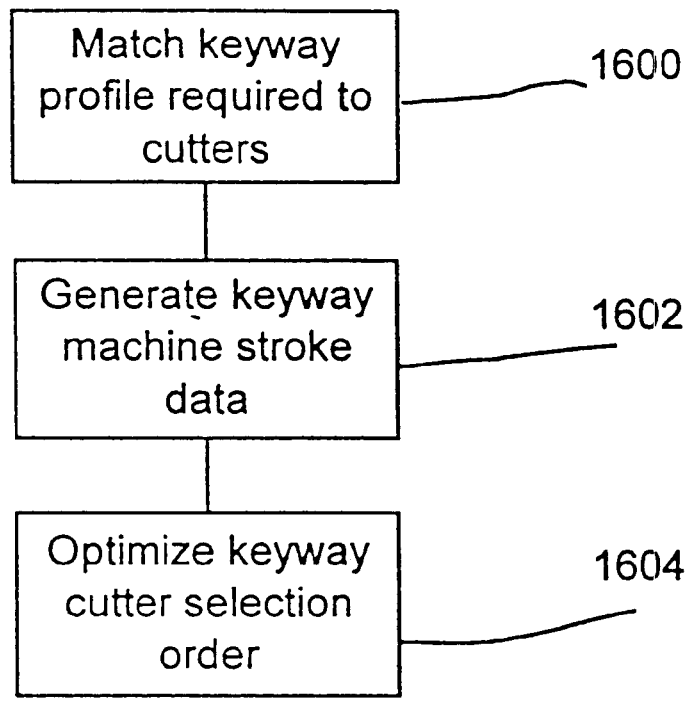
FIG. 16 lists process steps for producing cutting instructions for a keyway; FIG.

A sequence of steps for producing cutting instructions for a keyway is illustrated in FIG. 16. First, a match is made between the measured keyway profile and the cutters required to cut the profile, in step 1600. Using the de-glitched and smoothed keyway profile data from the original key, the shape geometry of the keyway profile is matched to one or more edge cutters 250. In performing this matching, the processor selects for each keyway channel the keyway cutter that will remove the most material and will most closely approach the profile without overcutting, for the first pass. Each channel of the keyway on each side of the key may require multiple machining passes using more than one edge cutter 250 to produce the profile line within the acceptable profile tolerance.

Next, the machine stroke is generated for producing the keyway. Using the edge cutters 250 selected in step 1600 for each keyway channel, the stroke or pass pattern is computed that approximates the keyway profile shape within the acceptable profile tolerance. Each keyway channel is computed for each side of the key individually. By approximating the desired keyway profile within the acceptable keyway profile tolerance with the fewest number of machining strokes or passes, then the machining time for performing the keyways may be minimized.

The keyway cutter selection order is then optimized, in step 1604. One method of optimizing the selection order is to order of cutter passes per channel so that minimizes cutter selection motion, i.e. the transverse motion of the preform 246 to move from one edge cutter 250 to another is reduced, while permitting maximum material removal per pass. This method may be used to minimize the time to complete a given keyway side. The keyway on the first side of the preform 246 is completed prior to rotating the key for machining the keyway on the opposite side.

Figure 17:
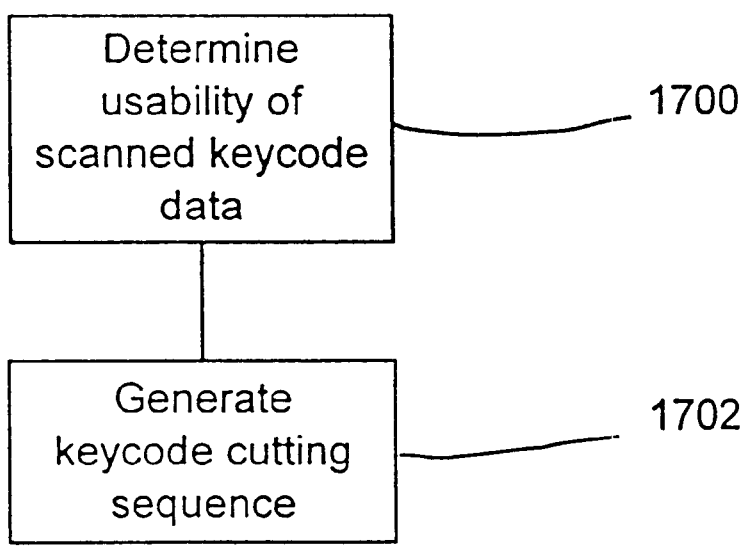
FIG. 17 lists process steps for producing cutting instructions for a keycode.

A sequence of steps for determining a cutting sequence for keycodes is illustrated in FIG. 17. First, the usability of the scanned keycode data is determined, in step 1700. Using the de-glitched and smoothed keycode data measured from the original key, and using known keycode step increments for keys of the measured style and geometry, information supplied by the original manufacturer, the usability of the measured data without compensation is determined. Keycode data that is either too heavy or too thin may be the result of measuring from a worn key or an oversized duplicate of the manufactured key. The controller 900 may request from the user, for example, through the display 920, whether compensation should be applied and also whether the key may be oversized or worn. The duplicate key can then be made according to standard keycode increments for the style and geometry of the original key 202. If the keycode data are not generally offset, but instead are incrementally offset, then the controller may decide that no compensation for wear or oversized conditions should be included.

Next, the keycode cutting sequence is generated, in step 1702. Keycodes are machined in a single direction pass per edge, starting at the key bow and progressing to the key tip. The keycode cutter 252 is positioned perpendicular to the keyway access on the key bow side, flat on the perimeter, and 45° beveled on the key tip side. The keycode cutter is oriented with the rotating access parallel to the keyway access. A continuous machining pass is started with a plunge cut at the key bow end, followed by side cutting with angled transitions either in or out to reach and machine each keycode step of the key. Double-sided keys are machined on each edge sequentially. Keycode passes may be repeated at incremental depths, and/or partial passes until the final geometry is reached.

Figure 19:
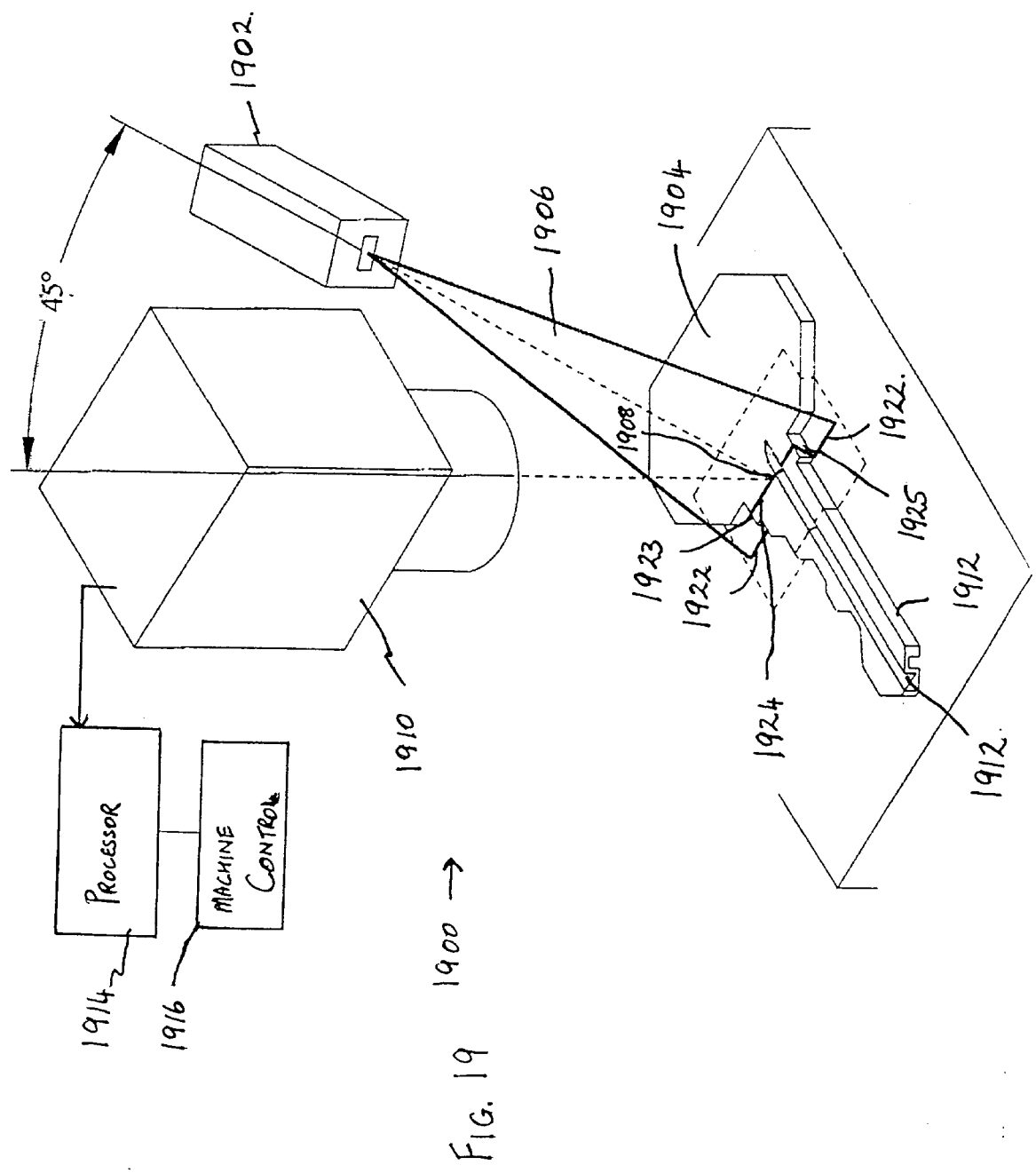
FIG. 19 illustrates a first system for measuring a keyway using structured light.

Various other methods of determining the keycode and the profile of the keyway of the original key, within the scope of the invention, may be used in addition to those methods described above, that use, for example, electromagnetic, optical, electrical magnetic, or mechanical techniques. One method is the use of structured light, which is useful for obtaining height profiles of quasi-flat objects, such as a keyway of a key. A system for monitoring a keyway profile using structured light is illustrated in FIG. 19. The system 1900 includes a laser stripe generator 1902 that illuminates the key 1904. The laser stripe generator generates a beam of light 1906 that comes to a line focus 1908 on the surface of the key 1904. The laser stripe generator may be, for example, the model SNF-501 L-670S-5-10, produced by Lasiris Inc. This model is capable of producing a focused line about 15 mm in length (0.6") and 38 µm wide (0.0015") at a stand-off distance of about 90 mm (3.5").

A video camera 1910, such as a 2-D CCD camera, is positioned above the key 1904 to receive light deflected from the line focus 1908 on the surface of the key 1904. The camera 1910 may be, for example, a high resolution, monochromatic video camera such as the model TM-7 produced by Pulnix, the Hitachi KP-M2, and the Costar CV-M50. A high resolution camera typically has a CCD detector with 768×494 pixels, although other sizes of CCD detector may also be used. It will be appreciated that the measurement resolution of deep features on the surface of the key 1904 may be affected by the depth of field of the light beam 1906.

The axis of the camera 1910 is positioned at an angle relative to the direction of the light beam 1906. Therefore, the camera detects a lateral shift in the position of the line focus 1908 arising from a change in the height of the surface. When the angle is selected to be 45°, as illustrated, a unit change in the height of the surface causes a unit change in the lateral position of the light stripe on the surface of the key 1904. The line focus 1908 is positioned at a point along the key where the key blade 1912 is widest, thus ensuring that the measurement of the keyway profile covers all the features of the keyway.

Once the camera 1910 has detected the line focus 1908, the detection data are passed to a processor, 1914, which may include a screen grabber, for analysis. The processor 1914 analyzes the data to determine the shape and size of the keyway profile. Once the profile is determined, the processor 1914 assembles machining instructions for cutting the measured keyway profile into the blank preform.

Figure 20:
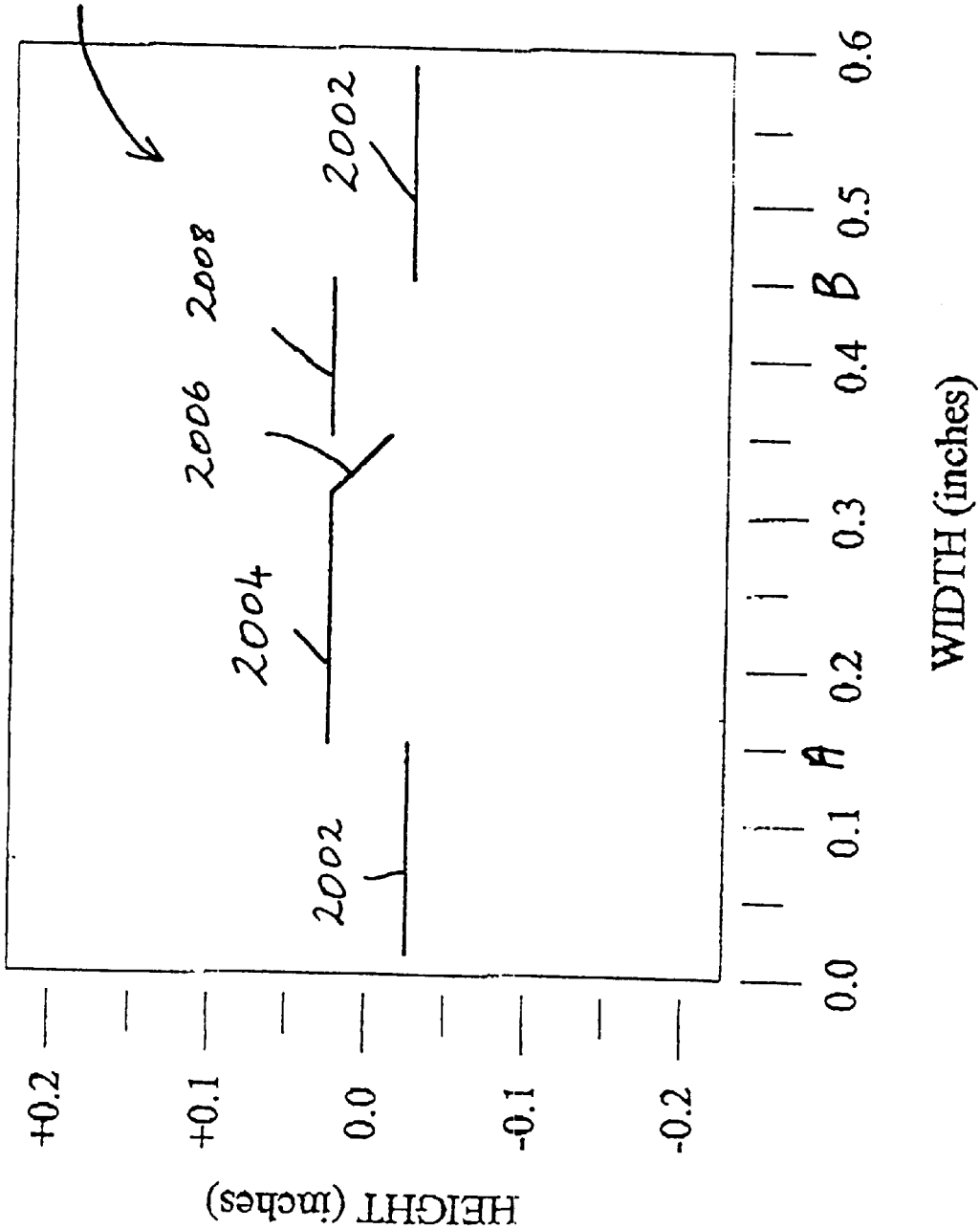
FIG. 20 illustrates exemplary results produced by the system illustrated in FIG. 19.

An example of the output signal from the camera 1910 is illustrated in FIG. 20, which shows the measured profile for the key 1904 of FIG. 19. The end portions 2002 of the signal correspond to those portions 1922 that are incident on the supporting surface for the key shown in FIG. 19. The outer edges of the key shown at points A and B correspond to shoulders 1923 and 1925. The long portion of the signal 2004 corresponds to the portion 1924 that lies between the first shoulder 1923 and the groove 1913. The angled portion of the signal 2006 corresponds to the angled face of the groove 1913. The remaining flat portion 2008 of the signal corresponds with the short flat section from the groove 1913 to the second shoulder 1925. The signal 2000 is shown plotted as a function of distance in two dimensions. The data may also be stored digitally, and converted to distance measurements where a calibration factor for pixel spacing is known.

It will be appreciated that variations of this method of detecting the keyway profile may be used. For example, rather than projecting a line focus on to the key, the light projector may scan a spot across the key to resemble a line focus. Additionally, the detector may also be a 1-D detector array that is translated across the field of view to generate a series of 1-D images that form a composite 2-D image.

Figure 25:
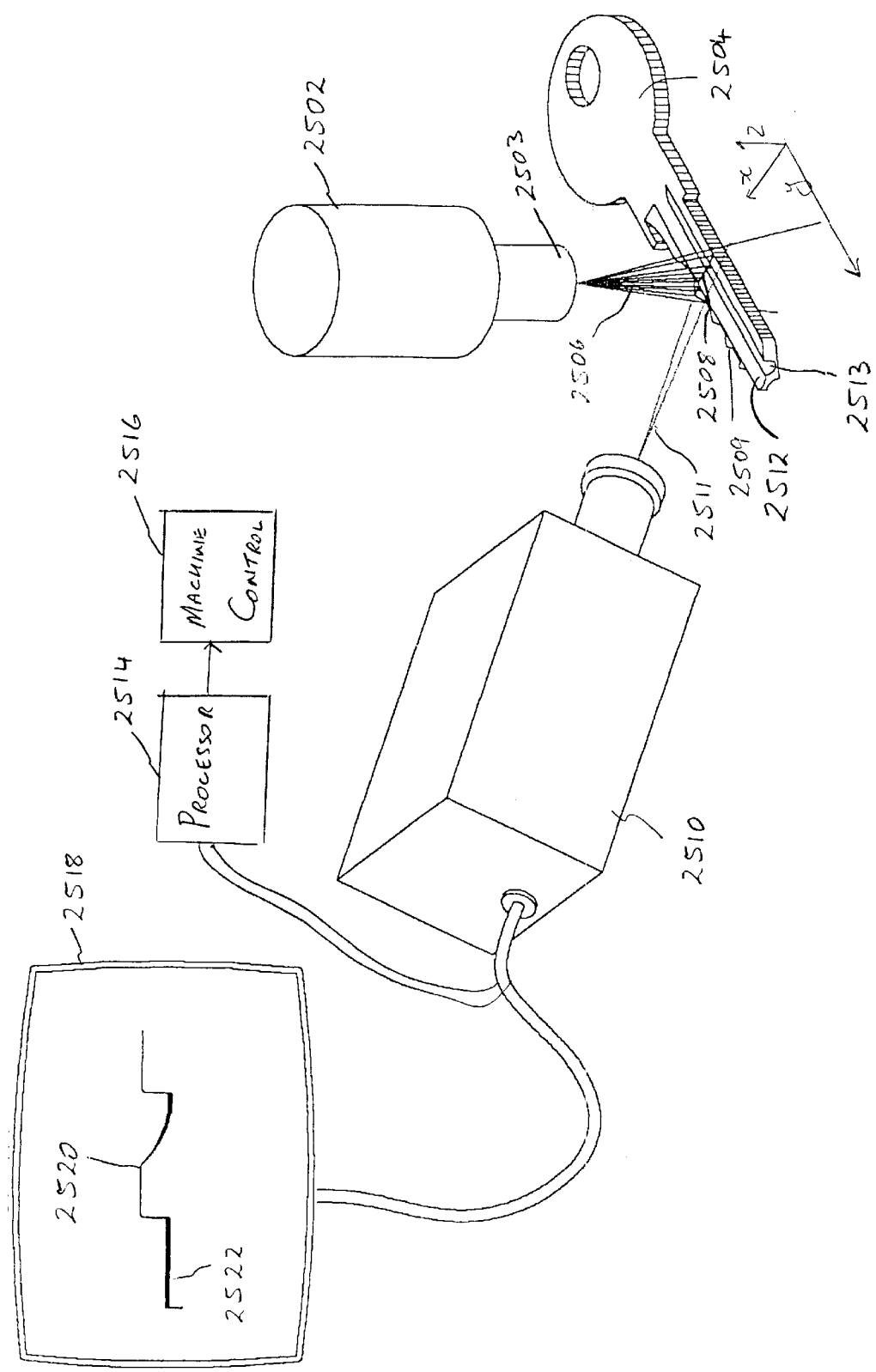
FIG. 25 illustrates a second system for measuring a keyway using structured light according to an embodiment of the invention.

Another embodiment of a system for measuring a key is illustrated in FIG. 25. A light source 2502 illuminates a key 2504 with a beam of light 2506 that comes to a line focus 2508 on the surface of the key 2504. The light source 2502 may include a laser and a lens system 2503 to provide a focused stripe of light. This may be, for example the model SNF-501 L-6705-5-10 manufactured by Lasiris Inc. The light source 2502 may produce a fan of light that focuses to the stripe, or may scan a focused spot to form the focused stripe. The light beam 2506 is directed substantially perpendicular to the upper surface 2512 of the key 2504 that includes a groove 2513 forming at least part of the keyway. The light 2506 incident on the key 2504 is approximately perpendicular to the y-axis, which is parallel to the shank of the key. The light 2506 is incident on the key 2504 over a range of angles in the x-direction because the light 2506 diverges from the light source 2502 in the x-direction. The focusing optics in the light source 2502 may be adapted to compensate for the different path lengths traveled by different rays propagating at different x-angles so that each ray focuses in substantially the same z-plane. The upper surface 2512 may also be referred to as a major surface.

A detector 2510, for example a 2-D charge-coupled-device (CCD) camera, or the like, is positioned to receive light deflected by the surface 2512 at an angle relative to the direction of the light beam 2506. The detector 2510 may be a high resolution, monochromatic video camera such as the model CV-M50 manufactured by Castor. A high resolution camera typically has a CCD detector with 768×494 pixels, although other sizes of CCD detector may also be used. It will be appreciated that the measurement resolution of deep features on the surface of the key 2504 may be affected by the depth of field of the focus 2508 of the light beam 2506.

The output from the detector 2510 may be transmitted to a processor 2514, which analyzes the data and converts it to machining instructions for generating a duplicate key. The machining instructions may be directed to the machining control 2516 to control the generation of the duplicate key. A view of the light detected by the detector 2510 may be displayed by a display 2518, which shows a measured profile 2520 of the surface 2512. The data received by the detector 2510 may be used to determine not only the profile of the key surface 2512, to reveal the keyway, but may also be used to measure the keycode, by scanning either the key 2504 or the light source 2502 in the y-direction. The profile 2520 changes as the beam 2506 is passed along the length of the key 2504. In particular, the length of the left portion 2522 of the profile changes in a manner corresponding to the keycode 2509 cut in the left edge of the key 2504. The changes in the length of the left portion 2522 may be stored and correlated with the position on the key to produce data associated with the keycode. It will be appreciated that the keycode of a double-sided key, one having a key code on each edge, may also be measured in the same manner. It will further be appreciated that the keycode may also be measured without scanning the light beam 2506 along the key 2504, for example by using multiple beams of light and multiple detectors.

Figure 26:
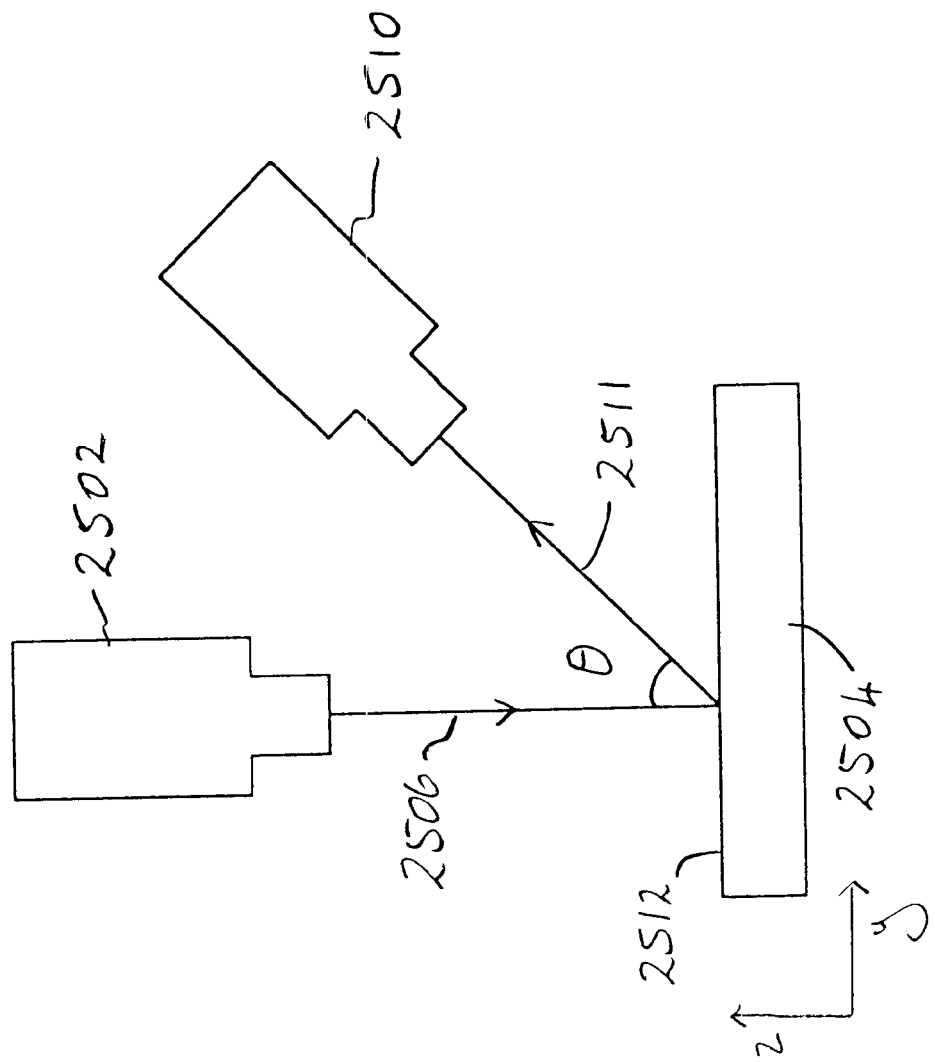
FIG. 26 illustrates a schematic of the second system for measuring a keyway using structured light according to an embodiment of the invention

This embodiment of measuring the key 2504, with the light beam 2506 approximately perpendicular to the key surface 2512, has advantages relative to the embodiment illustrated in FIG. 19, where the video camera 1910 is perpendicular to the key surface and the light beam 1906 is incident at an oblique angle on the key surface. It is useful to define the angle θ, which is the angle between the incoming light beam 2506, approximately perpendicular to the key surface 2512, and the axis 2511 of the detector 2510. This is illustrated in FIG. 26. The angle θ is typically greater than about 30°, although it may be smaller than this. The angle θ may be 45° or greater.

Figure 27:
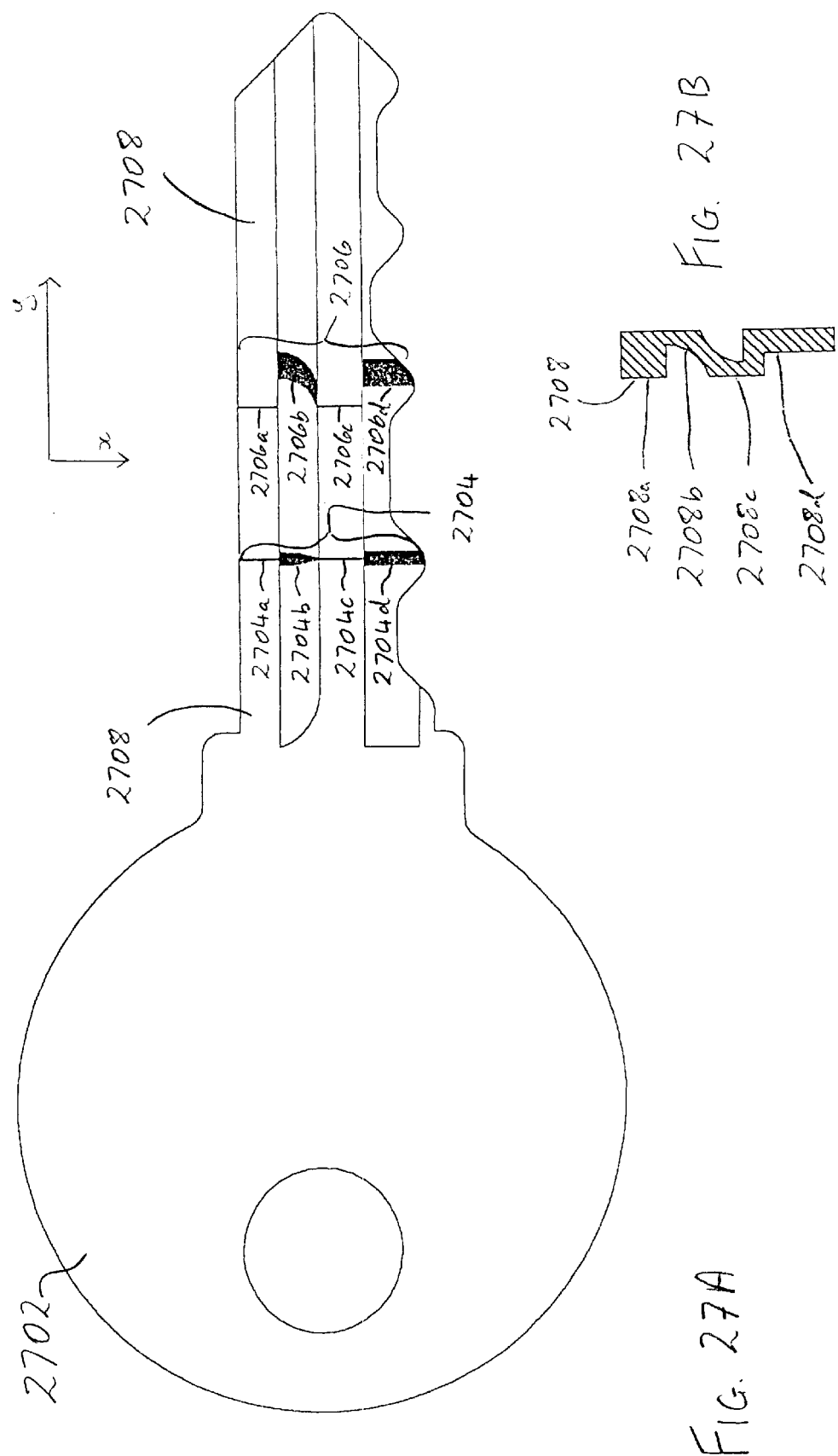
FIG. 27 illustrates a key illuminated with a perpendicular light beam and a light beam at an oblique angle.

One of the advantages is explained with reference to FIG. 27A, which shows a key 2702 with two lines of light 2704 and 2706. The first line 2704 represents the focal line of light where the light source is perpendicular to the key surface 2708, while line 2706 represents the focal line of light where the light is incident on the surface 2808 at a non-perpendicular angle, for example as shown in FIG. 19.

The cross-section of the key 2702 is assumed be the section 2710 illustrated in FIG. 27B, and the illuminated surface 2708 is shown to comprise four separate components: the first part 2708a, is flat, the second part 2708b is a groove having a vertical side and a curved side, the third part 2708c is flat and at the same level as the first part 2708a, and the fourth part 2708d is also flat but at a level below the third part 2708c.

The lines of light 2704 and 2706 each have components 2704a–2704d and 2606a–2706d respectively that correspond to the different parts 2708a 2708d of the surface 2708. The widths of the lines 2704 and 2706 are exaggerated in the figure for clarity. The first part 2704a of the first light line 2704 is the line focus, where it is assumed that the light focuses on the first part 2708a of the key surface 2708. The second part 2704b of the first light line corresponds to the grooved surface 2708b. The width of the second part 2704b is greater nearer the first part 2704a, corresponding to the deepest part of the groove 2708b. Since the light beam 2506 has a finite depth of focus, the light reaching the bottom of the groove is out of focus, and therefore forms a broader line than on the first part 2704a. The width of the second part 2704b decreases towards the third part 2704c, corresponding to the wall of the groove 2708b curving up to meet the third part 2708c. The width of the third part 2704c of the first light line 2704 is similar to the width of the first part 2704c, since the third part of the surface 2708c is at the same height as the first part 2708a. The width of the fourth part 2704d of the first light line 2704 is larger than the width of the third part 2704c, since the fourth surface part 2708d is lower than the third surface part 2708c, hence the light is out of focus.

The first part 2706a of the second light line 2706 line is the line focus, where it is assumed that the light focuses on the first part 2708a of the key surface 2708. The second part 2706b of the second light line corresponds to the grooved surface 2708b. The width of the second part 2706b is greater nearer the first part 2706a, corresponding to the deepest part of the groove 2708b. Furthermore, the maximum width of the second part 2706b is larger than the maximum width of the second part 2704b of the first light line 2704, since there is a greater path difference for the light to reach the bottom of the groove 2708b. Hence, the light reaching the bottom of the groove 2708b is further out of focus when the light is incident at an oblique angle than when the light is incident perpendicular. The second part 2706b narrows and curves towards the third part 2706c, corresponding to the wall of the groove 2708b curving up to meet the third part 2708c. The width of the third part 2706c of the second light line 2706 is similar to the width of the first part 2706c, since the third surface part 2708c is at the same height as the first part 2708a. The width of the fourth part 2706d of the second light line 2706 is larger than the width of the third part 2706c, since the fourth surface part 2708d is lower than the third surface part 2708c. Furthermore, the width of the fourth part 2706d of the second light line 2706 is greater than the width of the fourth part 2704d of the first light line 2706, since the oblique illumination of the second light line 2706 results in the fourth part 2706 being further out of focus.

Therefore, perpendicular illumination of the key results in narrower light stripes than where the illumination is oblique, which may result in increased resolution when analyzing the signal detected by the camera, thus leading to the generation of more accurate duplicate keys.

Perpendicular illumination of the key also results in a more accurate measurement of the key code. In FIG. 27A, the y-axis locations of the light line components 2706a–2706d produces with oblique illumination vary with the height of the key surface. This can lead to measurement errors of the y-axis co-ordinate of the key code along the length of the key. The y-axis locations of the light line components 2704a–2704d produced with perpendicular illumination do not vary with the height of the key surface, thus eliminating any y-axis co-ordinate measurement errors which may be introduced by changes in the height of the key surface along the edge of the key. This feature and the narrower light stripe generated by the perpendicular illumination both lead to improved resolution and accuracy of the measured key code information.

Figure 28:
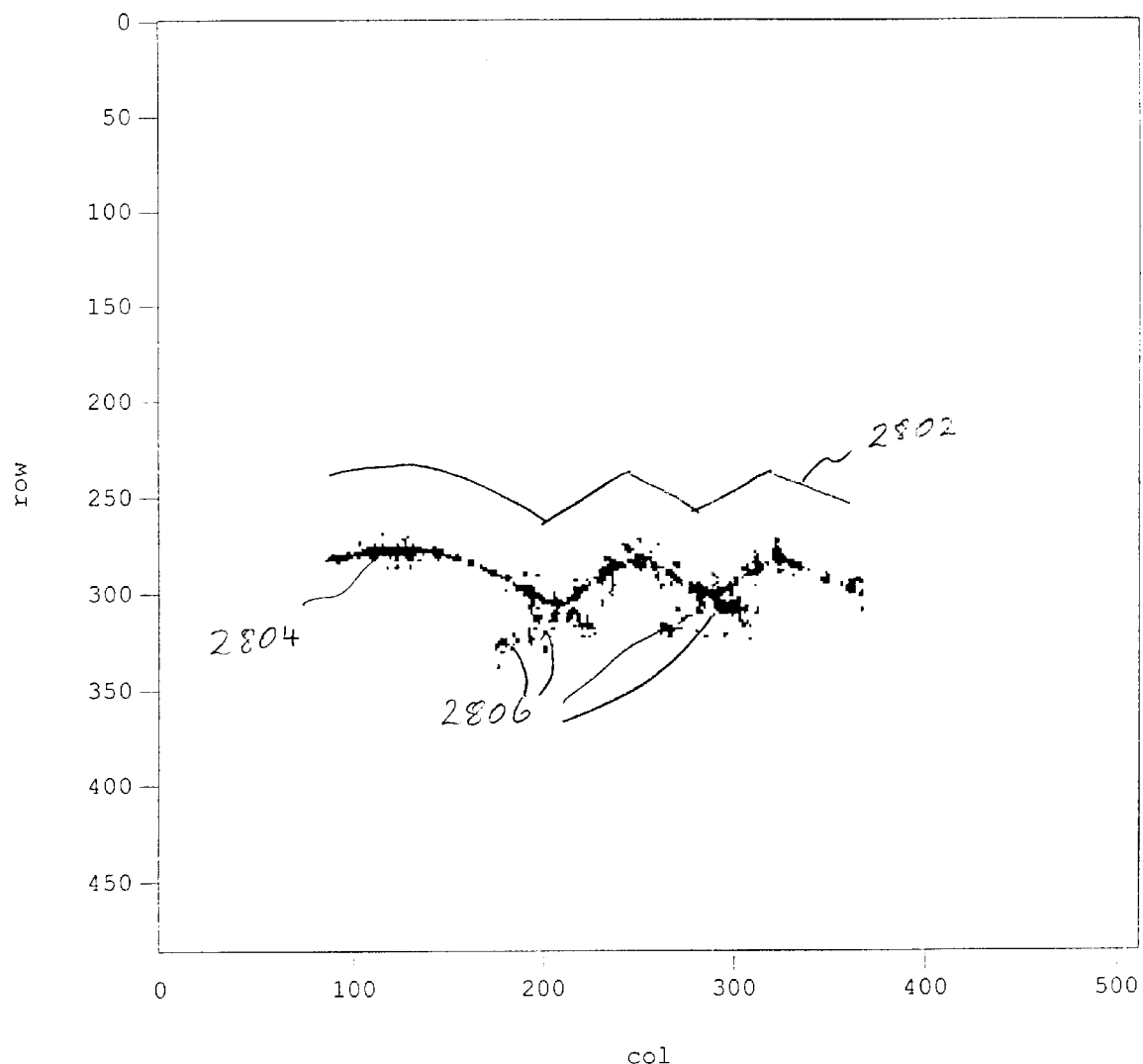
FIG. 28 illustrates ideal and measured profiles of a key using the second system for measuring a keyway using structured light.

Another advantage to perpendicular illumination is that the noise in the measured data is reduced. This is discussed with respect to FIGS. 28 and 29. The first line 2802 in FIG. 28 shows the ideal profile of the key. The second line 2804 shows actual data of the key when the illumination is perpendicular to the key surface. The second line 2804 shows some stray data points 2806 that are associated with a corner of the key surface. However, these stray data points 2806 appear only on one side of the line 2804 and may simply be discarded in the analysis of the data. It is believed that the stray data points arise from multidirectional reflections of light by the machined surface of the key.

Figure 29:
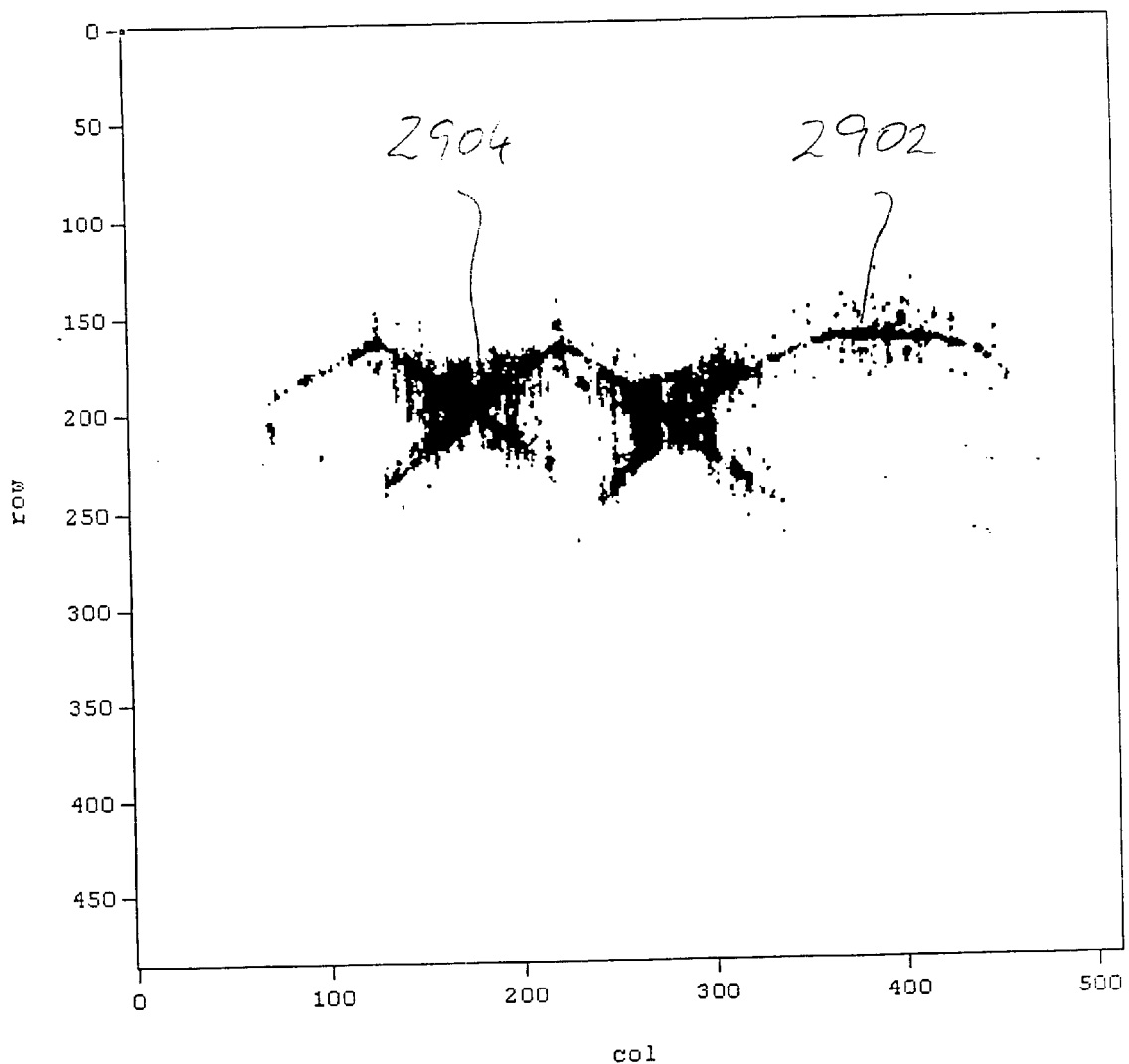
FIG. 29 illustrates a measured profile using structured light incident on the key at an oblique angle.

FIG. 29 shows measurements of the same key taken when the light from the light source is incident on the key at an oblique angle. The orientation of the key is the mirror image of that when the measurement of FIG. 28 was made. However, the data line 2902 shows, for example at region 2904 that stray data points fall on both sides of the line, rather than just one side. This makes analysis of the measured data more difficult, and reduces the likelihood that the measurements made with oblique illumination will lead to accurate machining instructions for the duplicate key.

To summarize, illuminating the key with a light beam perpendicular to the major key surface being measured provides advantages over the use of a light beam at an oblique angle. These advantages include an increased resolution arising from the depth-of-focus effect, and reduced noise levels in the measured data.

Another method for determining the keyway profile of a key is to optically read a code from the key itself, and correlate the code with a particular keyway profile. For example, the key illustrated in FIG. 1A shows a key 100 with a key code 108 stamped on the key bow 104. Conventionally, the key code 108 contains information only related to the keycode 106. However, the key code 108 may be configured to contain information related to the keyway 110. Thus, a user may be able to read the number off the key bow 104 and refer to a look-up table or otherwise process the information provided by the number to identify the keyway profile associated with the code 108 read from the key bow 104.

Also, in an automated version of the method just described, a video camera may be used to record an image of the key code 108 and the results analyzed to determine the code read off the key 100 by the camera. After determining the code, the code could be used, for example, with a look-up table to relate the code read off the key 100 with the key's keyway profile. Additionally, the code provided by the key, in this embodiment or any other embodiment described herein, may include machining instructions for the processor to follow.

Figure 21:
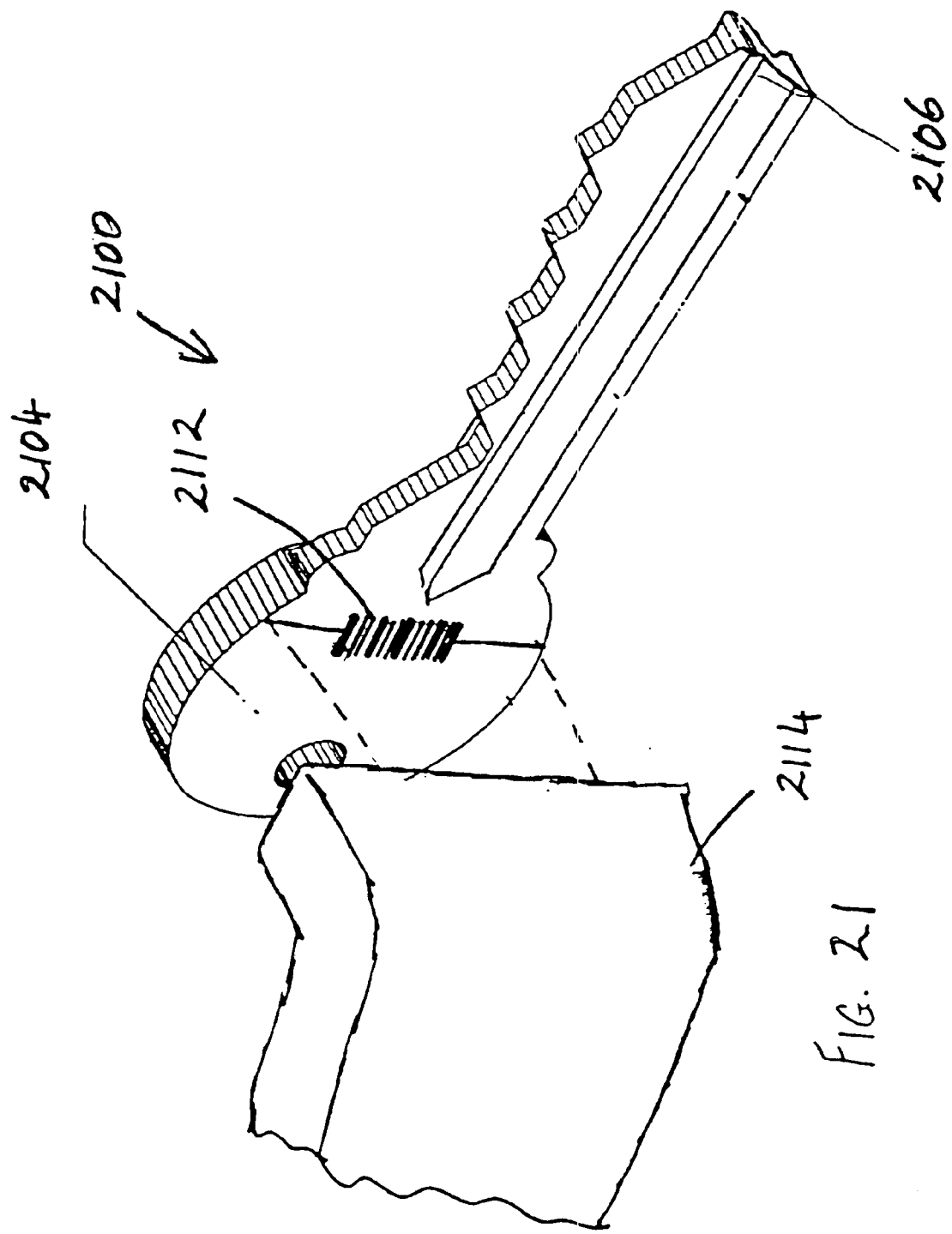
FIG. 21 illustrates a method of obtaining keycode and keyway information from a key using an optical reader.

In another approach, shown in FIG. 21, the key 2100 may include a code, such as a bar code 2112 on the key bow 2104. The bar code may be read by a bar code reader 2114, and the code that is read off the key 2100 then related, such as through a look-up table or other method, to the keyway profile 2106 of the key 2100. The bar code reader 2114 may operate in a manner similar to bar code readers as are used in offices and supermarket sales check-out units, where the bar code reader 2114 illuminates the key 2100 with a line of light, and the code 2112 is read from the light reflected by the bar code 2112.

Figure 22:
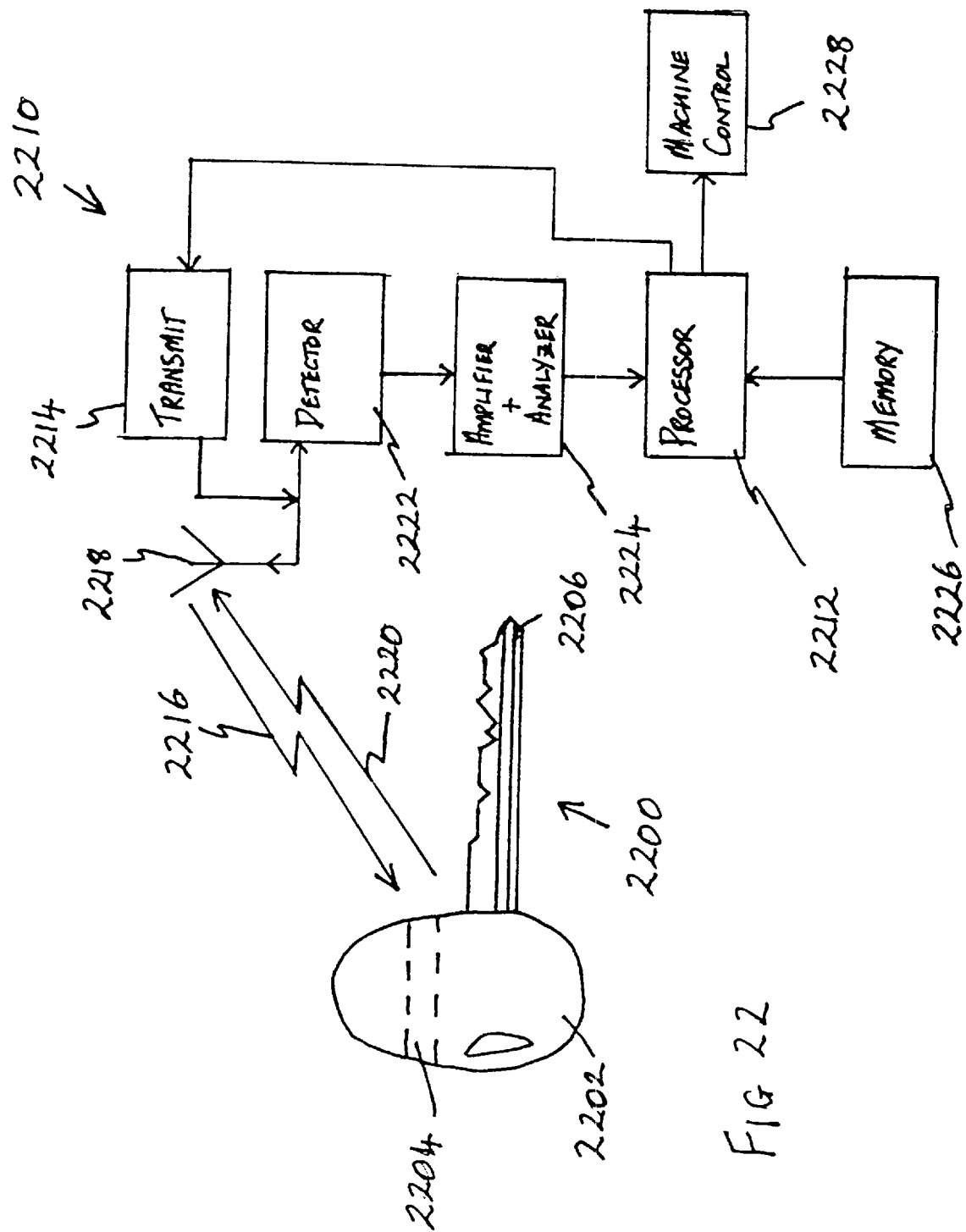
FIG. 22 illustrates a system for obtaining keycode and keyway information from a key having an identification transponder.

Another method of determining the keyway profile of a key, particularly useful for car keys that include a security transponder, is illustrated in FIG. 22. Here, the key 2200 is of the type commonly used as a car door and ignition key, where the key bow 2202 contains a miniaturized RF transponder 2204. This type of key is often used to provide extra security because a transmitter located in the steering column of the car interrogates the key 2200 once it is placed in the ignition. If the transponder 2204 does not respond with the correct code, which may be a 64-bit digital code, then the car's ignition is disabled. The RF transponder 2204 is typically inductively powered by the transmitter.

The transponder 2204 may also be used to identify the keyway profile 2206 of the key 2200. The system 2210 used for interrogating the key 2200 includes a processor 2212 that generates an interrogation signal which is converted into a transmissible signal in the transmitting unit 2214. The interrogation signal 2216 is transmitted by an antenna 2218. The transponder 2204 in the key 2200, responds by transmitting a response signal 2220 that is received by the antenna 2218 and detected in a detector 2222. The detected signal is typically analyzed and amplified in the amplifier and analyzer 2224 where it is converted into processor-readable form, before being returned to the processor 2212.

The processor 2212 is connected to a memory 2226 that typically contains a look-up table that relates the response code received from the key 2200 with the keyway profile 2206. After the processor 2212 has determined which keyway profile 2206 is associated with the response code received from the key 2200, the processor 2212 generates machining instructions for the machine control unit 2228 that controls the cutting tools used to cut the appropriate keyway in the key preform.

Figure 23:
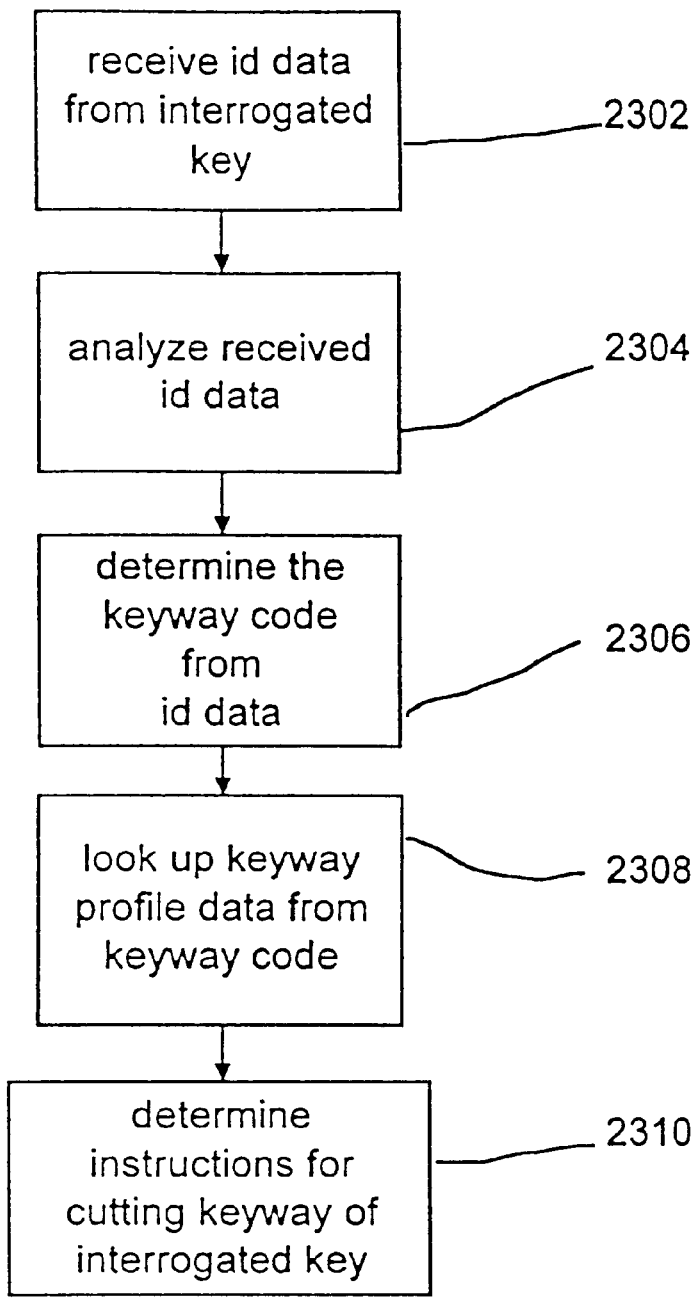
FIG. 23 illustrates method steps for obtaining keyway machining instructions for the system illustrated in FIG. 22.

Method steps for this method are illustrated in FIG. 23. The system 2210 interrogates the key 2200 and receives the identification code back from the transponder, at step 2302. The received data are analyzed, at step 2304 and then passed to the processor 2212 in a form suitable for the processor 2212. If applicable, the processor 2212 determines which portion of the received code corresponds to keyway profile information, at step 2306. The processor then determines, for example using a look-up table, which particular keyway profile is associated with the identification code, at step 2308. The processor then forms a set of machining instructions for cutting the keyway profile in the key preform, at step 2310. These instructions are passed to the machine controller 2228 that controls the cutting tools.

Other forms of transponder may be used. For example, the key may optically transmit a response signal, for example in the visible or infrared portions of the spectrum, rather than an RF response signal. In addition, the key may receive an optical interrogation signal, using a photodetector rather than an RF receiving antenna.

Figure 24:
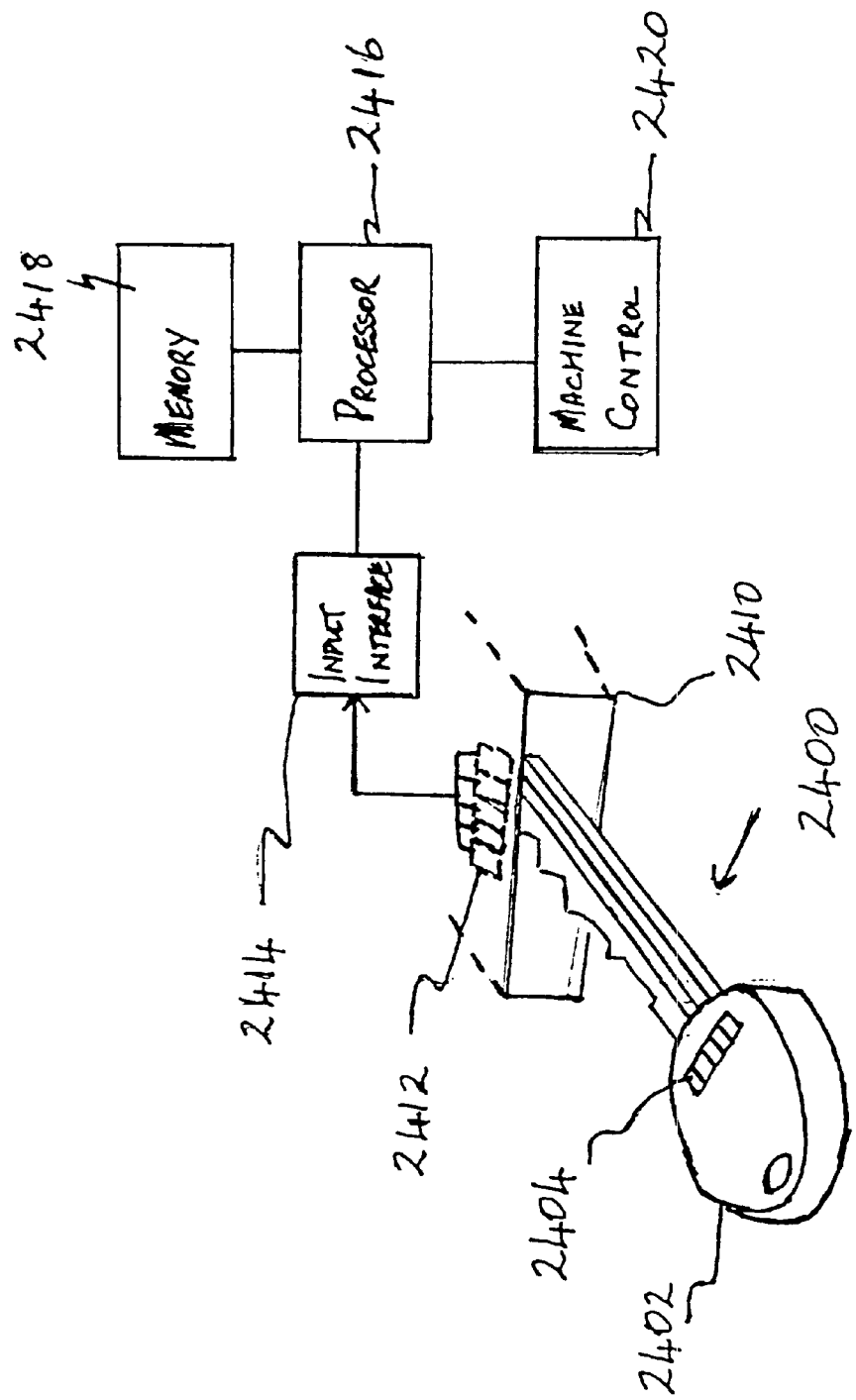
FIG. 24 illustrates a system for obtaining keycode and keyway information from a key using electrical contacts.

Another method of determining the keyway profile of a key is illustrated in FIG. 24. In this method, the key 2400 includes an electronic circuit, typically in the bow portion 2402, that is provided with electrical contacts 2404. The key 2400 may be placed in a key reader 2410 that includes reader contacts 2412 that mate up with the key contacts 2406. The reader contacts 2412 are connected, through an input interface 2414, with a processor 2416. Once the processor 2416 is in contact with the key 2400, the processor can interrogate the electronic circuit for information related to the keyway profile. For example, the information supplied by the key may include a description of the keyway profile, but more likely includes a code that the processor 2416 can use with a look-up table stored in a memory unit 2418 to determine the keyway profile. This method has similarities to that described above in connection with FIGS. 22 and 23, but where the signals passed between the processor 2416 and key 2400 are electrical. Once the processor 2416 has determined which keyway profile is associated with the key 2400, the processor 2416 can generate or retrieve machining instructions to pass on to the machine control unit 2420 that controls the machining process when fabricating the keyway profile in the key preform.

While various examples were provided above, the present invention is not limited to the specifics of the examples. For example, the duplication apparatus may be provided with two holders, one for holding the key to be copied and the other for holding the preform. Also, the apparatus may be inverted or rotated to allow cutting scraps to fall free of the machine elements. Furthermore, the processor may incorporate the machine control unit that controls the formation of the duplicate key.

Additionally, it is possible to supply semi-prepared preforms to the duplicating apparatus, where the keycode has already been cut or partly formed. The duplicating apparatus may simply measure the keyway of the original key and duplicate the keyway in the preform, and may also duplicate the remainder of the keycode if necessary.

As noted above, the present invention is applicable to duplicating keys from original keys from a blank preform. It is believed to be particularly useful in producing duplicate keys where it is desirable to reduce the expected degree of skill of the operator and to reduce the number of rejected duplicates. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of measuring an original key having a keyway on a major surface of a key shaft, comprising:
   illuminating the major surface of the key shaft with a line of light focused approximately on the major surface of the original key, the light propagating in a direction substantially perpendicular to a longitudinal axis of the shaft; and
   detecting light deflected from the line of light by the surface of the original key at an angle non-perpendicular to the major surface.

2. The method of claim 1, further comprising focusing the light to a line focus approximately on the major surface of the original key.

3. The method of claim 1, further comprising focusing the light to a spot focus and scanning the spot focus across the shaft of the original key.

4. The method of claim 1, further comprising determining a characteristic of the keyway of the original key from the detected light.

5. The method of claim 4, further comprising machining, in a key preform, a keyway duplicate of the keyway of the original key.

6. The method of claim 5, further comprising generating a signal indicative of the keyway of the original key and generating machining instructions for machining the duplicate keyway in the preform from the signal indicative of the keyway of the original key.

7. The method of claim 1, wherein the angle is at least 30°.

8. The method of claim 1, further comprising translating the line of light along the shaft of the original key.

9. The method of claim 8, further comprising translating the line of light along the shaft of the original key between one end of a key code of the key and the other end of the key code.

10. The method of claim 1, further comprising determining a key code of the original key from the detected light.

11. The method of claim 10, further comprising translating the line of light along the shaft of the original key between one end of a key code of the original key and the other end of the key code and generating a signal indicative of the key code of the original key.

12. The method of claim 11, further comprising generating machining instructions for machining a duplicate key code in a key preform from the signal indicative of the key code of the original key and forming the duplicate key code in the key preform using the machining instructions.

13. The method of claim 10, further comprising machining, in a key preform, a key code duplicate of the key code of the original key.

14. A system for measuring an original key having at least one groove in a first major surface of a key shaft forming a keyway, the system comprising:

the original key having at least one groove in the first major surface of the key shaft forming a keyway;

a key holder to hold the original key in a pre-selected position with the key shaft approximately parallel to a first axis;

a light source producing a beam of light directed substantially perpendicularly to the first axis towards the first major surface and illuminating a line across the key shaft when the original key is held in the pre-selected position; and a light detector positioned to receive light deflected in a direction substantially non-perpendicular to the first axis when the original key is held in the key holder at the pre-selected position.

15. The system of claim 14, wherein one of the key holder and the light source is mounted on a translation element to permit movement of the key holder relative to the beam of light in a direction parallel to the first axis.

16. The system of claim 15, further comprising a controller coupled to the translation element to control movement of the translation stage, and coupled to the light detector to receive data from the light detector.

17. The system of claim 14, wherein the key holder is rotatable so as to present a second major surface of the key shaft, the second major surface being parallel to the first axis, to the light source for illumination.

18. The system of claim 14, wherein the light source includes a focusing element to focus the light beam to a spot focused approximately at the first major surface and a scanning element to scan the focused spot across the shaft of the original key when the original key is in the key holder.

19. The system of claim 14, wherein the light source includes a focusing element to focus the light beam to a line focus focused approximately at the first major surface of the key when the key is held in the key holder.

20. The system of claim 14, wherein the light detector includes a two-dimensional array of light detecting elements.

21. The system of claim 14, wherein the light detector is positioned to receive light deflected by the key at an angle of at least 30° relative to the first axis.

22. The system of claim 14, further comprising a controller to generate a signal indicative of the keyway of the original key from light detected by the light detector.

23. The system of claim 22, further comprising machining tools coupled to receive machining instructions from the controller for machining a duplicate keyway in a key preform, the machining instructions based on the signal indicative of the keyway of the original key.

24. The system of claim 23, wherein the controller further generates a signal indicative of a key code of the original key from the light detected by the light detector and the machining tools are coupled to receive machining instructions from the controller for machining a duplicate key code in the key preform based on the signal indicative of the key code of the original key.

25. The system of claim 14, further comprising a controller to generate a signal indicative of a key code of the original key from light detected by the light detector.

26. The system of claim 25, further comprising machining tools couple to receive machining instructions from the controller for machining a duplicate key code in a key perform, the machining instructions based on the signal indicative of the key code of the original key.

27. The system of claim 14, wherein, a plane defined by light passing to the original key from the light source and from the key to the detector has a substantial component parallel to the first axis.

* * * * *